US012665539B2

(12) United States Patent
Wang et al.

(10) Patent No.: US 12,665,539 B2
(45) Date of Patent: Jun. 23, 2026

(54) SOLAR PHOTOVOLTAIC PANEL ASSEMBLY, VEHICLE, AND ELECTRIC DEVICE

(71) Applicant: XIAMEN DONESTY ECOMMERCE CO., LTD., Xiamen (CN)

(72) Inventors: Hao Wang, Xiamen (CN); Haojun Hong, Xiamen (CN); Jingshan Wei, Xiamen (CN)

(73) Assignee: XIAMEN DONESTY ECOMMERCE CO., LTD., Xiamen (CN)

( * ) Notice: Subject to any disclaimer, the term of this patent is extended or adjusted under 35 U.S.C. 154(b) by 0 days.

(21) Appl. No.: 18/795,223

(22) Filed: Aug. 6, 2024

(65) Prior Publication Data

US 2025/0337350 A1      Oct. 30, 2025

(30) Foreign Application Priority Data

Apr. 25, 2024    (CN) .......................... 202420879587.7

(51) Int. Cl.
*H02S 20/30* (2014.01)
*H02S 40/34* (2014.01)

(52) U.S. Cl.
CPC .............. *H02S 20/30* (2014.12); *H02S 40/34* (2014.12)

(58) Field of Classification Search
None
See application file for complete search history.

(56) References Cited

U.S. PATENT DOCUMENTS

2005/0161073 A1* 7/2005 Head ...................... H02S 10/40
136/245

FOREIGN PATENT DOCUMENTS

| | | | | |
|---|---|---|---|---|
| CN | 110165978 A | * | 8/2019 | .............. B60L 8/003 |
| CN | 110048672 B | * | 9/2020 | ............ H02S 40/34 |
| CN | 115001361 A | | 9/2022 | |
| CN | 219227531 U | | 6/2023 | |
| CN | 219287444 U | | 6/2023 | |
| CN | 116552255 A | | 8/2023 | |
| WO | 2024013778 A1 | | 1/2024 | |

OTHER PUBLICATIONS

International Search Report dated Apr. 23, 2025 in International Application No. PCT/CN2024/137613. English translation attached.

* cited by examiner

*Primary Examiner* — Dustin Q Dam

(57) ABSTRACT

The present disclosure provides a solar photovoltaic panel assembly, a vehicle, and an electric device. The solar photovoltaic panel assembly includes a support frame, a primary photovoltaic panel, and a secondary photovoltaic panel. The support frame is a split-type frame and includes a first frame and a second frame which are arranged opposite to each other. The primary photovoltaic panel is located between the first frame and the second frame. The first frame is connected to the second frame by the primary photovoltaic panel. The secondary photovoltaic panel is located between the first frame and the second frame and slidable along the first frame and/or the second frame into a storage position at which the secondary photovoltaic panel has a maximum overlapping area with the primary photovoltaic panel in a thickness direction and a deployment position at which the secondary photovoltaic panel slides outwardly relative to the primary photovoltaic panel.

17 Claims, 13 Drawing Sheets

D

10

E

512

54

53

513

41

43

F

414

422

58

52

32 ⎱ 3
31 ⎰

521

21

57

G—G

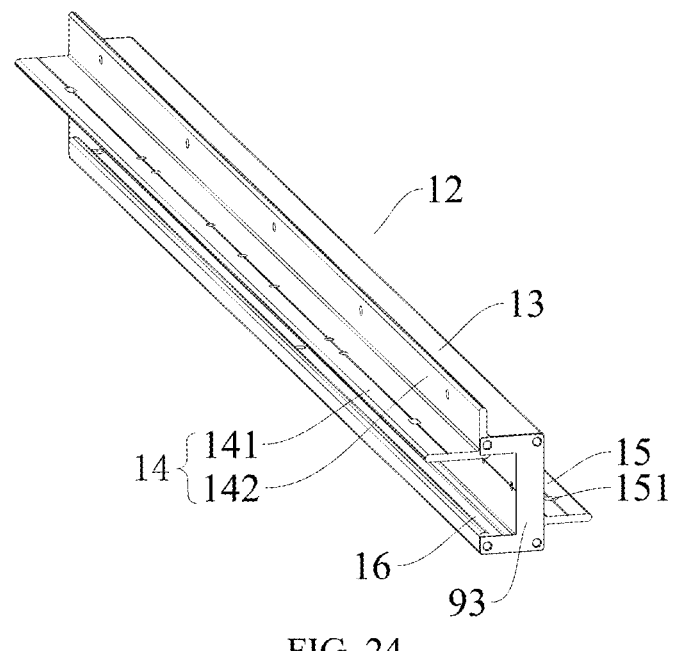
FIG. 24
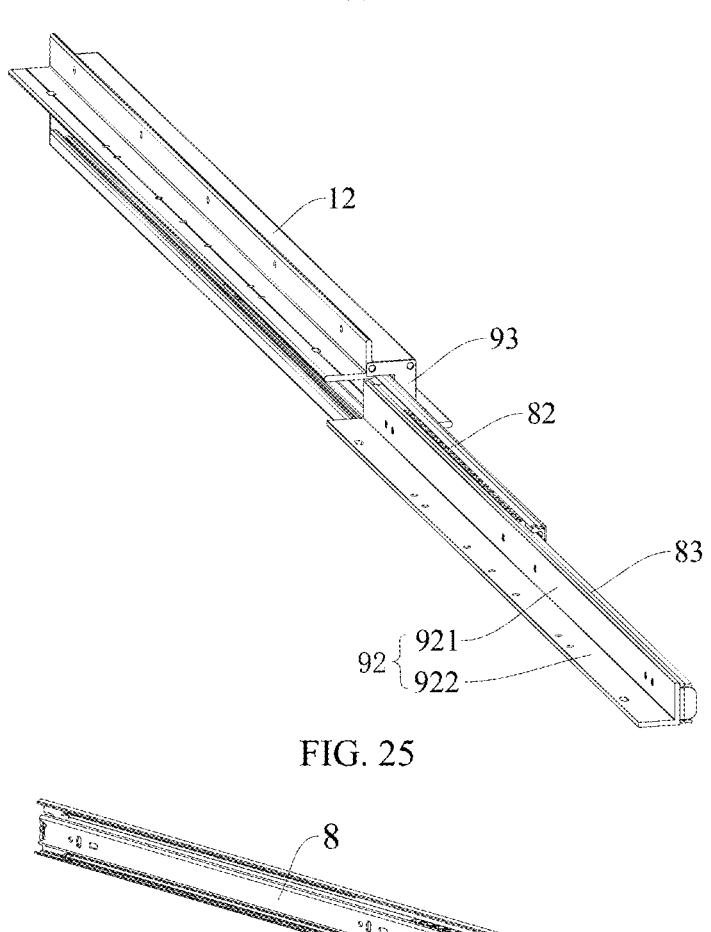
FIG. 25
FIG. 26

SOLAR PHOTOVOLTAIC PANEL ASSEMBLY, VEHICLE, AND ELECTRIC DEVICE

CROSS-REFERENCE TO RELATED APPLICATION

This application claims priority to Chinese Patent Application No. 202420879587.7 filed on Apr. 25, 2024, the entire contents of which are incorporated herein by reference.

FIELD

The present disclosure relates to the field of solar power generation, and more particularly, to a solar photovoltaic panel assembly, a vehicle including the solar photovoltaic panel assembly, and an electric device including the solar photovoltaic panel assembly.

BACKGROUND

Currently, recreational vehicle market is prosperous, and a power source of an electric equipment such as an electronic device, a television, a refrigerator, an air conditioner, or a water pumping device in a recreational vehicle is mainly from gasoline power generation of the recreational vehicle, urban electricity access, and power generation of solar photovoltaic panels. The gasoline power generation is significantly uneconomical from a point of view of economic convenience, and the urban electricity access is easily limited in a remote region. However, for the power generation of the solar photovoltaic panel, a storage battery may be charged as long as there is sunlight.

In the related art of an extendable support of the recreational vehicle, a solar photovoltaic panel assembly includes a support frame, a primary photovoltaic panel, and a secondary photovoltaic panel. The primary photovoltaic panel and the secondary photovoltaic panel are mounted on the support frame, but a weight of the support frame is heavy, which is not conducive to a lightweight design, with a high cost, poor stability, and poor user experience.

SUMMARY

The present disclosure aims to at least solve one of the technical problems in the related art to some extent. To this end, the present disclosure provides a solar photovoltaic panel assembly, which is conducive to a realization of lightweight, a reduction in cost, an increase in stability, and an improvement in user experience.

The present disclosure further provides a vehicle including the solar photovoltaic panel assembly, for example, a recreational vehicle.

The present disclosure further provides an electric device including the solar photovoltaic panel assembly.

The solar photovoltaic panel assembly according to the embodiments of the present disclosure includes a support frame, a primary photovoltaic panel, and a secondary photovoltaic panel. The support frame is a split-type frame and includes a first frame and a second frame. The first frame is arranged opposite to the second frame. The primary photovoltaic panel is located between the first frame and the second frame. The first frame is connected to the second frame by the primary photovoltaic panel. The secondary photovoltaic panel is located between the first frame and the second frame. The secondary photovoltaic panel is slidable along the first frame and/or the second frame into a storage position at which the secondary photovoltaic panel has a maximum overlapping area with the primary photovoltaic panel in a thickness direction and a deployment position at which the secondary photovoltaic panel slides outwardly relative to the primary photovoltaic panel.

With the solar photovoltaic panel assembly according to the embodiments of the present disclosure, the primary photovoltaic panel is used to connect the first frame and the second frame, without a need for providing a frame for connecting the first frame and the second frame. Therefore, it is conducive to a reduction in a total weight of the support frame and realization of a lightweight design of an overall structure of the solar photovoltaic panel assembly.

According to some embodiments of the present disclosure, the secondary photovoltaic panel is located at a side of the primary photovoltaic panel facing towards a mounting base.

According to some embodiments of the present disclosure, the solar photovoltaic panel assembly further includes a drive member fixedly mounted at the primary photovoltaic panel and configured to drive the secondary photovoltaic panel to slide.

According to some embodiments of the present disclosure, the drive member is in a form of an electrical telescopic rod and includes: a drive mechanism fixedly mounted at the primary photovoltaic panel; and a multi-segmented telescopic rod at least including a first telescopic rod segment and a final telescopic rod segment. An end of the first telescopic rod segment is located in the drive mechanism. Two adjacent telescopic rod segments of the multi-segmented telescopic rod are nested to each other. The final telescopic rod segment is fixedly connected to the secondary photovoltaic panel. The drive mechanism is capable of driving the multi-segmented telescopic rod to be extended away from or retracted towards the drive mechanism.

According to some embodiments of the present disclosure, the multi-segmented telescopic rod is of a rod-shaped structure, and an extendable direction of each telescopic rod segment of the multi-segmented telescopic rod is parallel to a sliding-out direction of the secondary photovoltaic panel.

According to some embodiments of the present disclosure, the drive member is located at a side of the secondary photovoltaic panel facing away from the primary photovoltaic panel; and the solar photovoltaic panel assembly further includes a first fixing support and a second fixing support. The drive mechanism is fixedly mounted at the primary photovoltaic panel through the first fixing support, and the final telescopic rod segment is fixedly mounted at the secondary photovoltaic panel through the second fixing support.

According to some embodiments of the present disclosure, each of the primary photovoltaic panel and the secondary photovoltaic panel includes a photovoltaic frame and a photovoltaic lamination structure fixedly mounted at the respective photovoltaic frame. The drive mechanism is fixedly mounted at the photovoltaic frame of the primary photovoltaic panel through the first fixing support, and the final telescopic rod segment is fixedly mounted at the photovoltaic frame of the secondary photovoltaic panel through the second fixing support.

According to some embodiments of the present disclosure, the photovoltaic frame has a profile with a thickness ranging from 1.5 mm to 4 mm. The photovoltaic frame has a threaded hole defined thereon. The solar photovoltaic panel assembly further includes a photovoltaic fastening bolt penetrating the first frame or the second frame to be fastened into the threaded hole.

According to some embodiments of the present disclosure, the first frame, the second frame, and the photovoltaic frame are each an aluminum alloy frame.

According to some embodiments of the present disclosure, the solar photovoltaic panel assembly further includes a junction box fixed to the first fixing support. The junction box has a plug connector provided thereon. The primary photovoltaic panel and the secondary photovoltaic panel are adapted to be connected to corresponding plug connectors.

According to some embodiments of the present disclosure, the solar photovoltaic panel assembly further includes a junction box waterproof cover adapted to be mounted and fixed to the junction box. A waterproof space is formed between the junction box waterproof cover and the junction box, and a connection between the primary photovoltaic panel and the plug connector corresponding to the primary photovoltaic panel and a connection between the secondary photovoltaic panel and the plug connector corresponding to the secondary photovoltaic panel are located in the waterproof space.

According to some embodiments of the present disclosure, the drive member further includes: a first limiting switch configured to limit an ultimate extended position at which the multi-segmented telescopic rod is extended away from the drive mechanism; and a second limiting switch configured to limit an ultimate retracted position at which the multi-segmented telescopic rod is retracted towards the drive mechanism.

According to some embodiments of the present disclosure, the drive mechanism includes a multi-segmented lead screw. Each telescopic rod segment of the multi-segmented telescopic rod is in a threaded connection with a corresponding lead screw segment. The multi-segmented lead screw includes a final lead screw segment having a rocker insertion opening defined at a rod end of the final lead screw segment. The final telescopic rod segment has a reserved emergency hole defined at a rod end of the final telescopic rod segment. The reserved emergency hole is used for a rocker to extend into the rocker insertion opening of the final lead screw segment, and the rocker is rotated to drive the multi-segmented lead screw to rotate, to drive the multi-segmented telescopic rod to be extended away from or retracted towards the drive mechanism.

According to some embodiments of the present disclosure, the solar photovoltaic panel assembly further includes an emergency limiting lock mounted at an end of the primary photovoltaic panel away from the drive mechanism. The emergency limiting lock includes a limiting lock housing and a lock tongue. The lock tongue is mounted at the limiting lock housing and is able to pushed to a blocking position at which the secondary photovoltaic panel is blocked from sliding.

According to some embodiments of the present disclosure, the solar photovoltaic panel assembly further includes a waterproof plug mounted at the final telescopic rod segment and blocking the reserved emergency hole.

According to some embodiments of the present disclosure, the solar photovoltaic panel assembly further includes a controller. The controller is a controller equipped with a remote controller or a controller controlled by an application. The controller is configured to receive a control instruction to control the drive member to operate.

According to some embodiments of the present disclosure, the solar photovoltaic panel assembly further includes a fixed wing fixedly mounted at each of the first frame and the second frame. The fixed wing has an adhesive accommodation groove defined at a side surface of the fixed wing.

According to some embodiments of the present disclosure, the fixed wing has a reserved screw site located at an end of the fixed wing; and the solar photovoltaic panel assembly further includes a wing fixing support including a first support plate and a second support plate connected to the first support plate. The first support plate is fixed at the reserved screw site, and the second support plate has a fixing hole defined thereon.

According to some embodiments of the present disclosure, the fixed wing has a fastener groove site located at a side of the fixed wing facing away from the adhesive accommodation groove; and the solar photovoltaic panel assembly further includes a wing fastening bolt penetrating the first frame or the second frame to be fastened to a nut in the fastener groove site.

According to some embodiments of the present disclosure, each of the first frame and the second frame includes: a frame body; a photovoltaic panel support arm connected to the frame body; and a wing mounting arm connected to the frame body and located at a side of the frame body facing away from the primary photovoltaic panel. The primary photovoltaic panel is mounted at a corresponding photovoltaic panel support arm. The fixed wing has a main body groove site. The frame body is embedded in the main body groove site. The wing mounting arm has a mounting hole defined thereon. The wing fastening bolt is engaged with the mounting hole.

According to some embodiments of the present disclosure, a sliding rail is disposed at each of the first frame and the second frame. The secondary photovoltaic panel is adapted to be in a sliding fit with sliding rails at two sides.

According to some embodiments of the present disclosure, the sliding rail is a multi-sectioned sliding rail. The multi-sectioned sliding rail at least include a first sliding rail section and a final sliding rail section. The first sliding rail section is mounted at a corresponding first frame or a corresponding second frame. The secondary photovoltaic panel is mounted at the final sliding rail section through an angle support, and two adjacent sliding rail sections of the sliding rail are slidable relative to each other in a sliding-out direction of the secondary photovoltaic panel.

According to some embodiments of the present disclosure, each of the first frame and the second frame includes: a frame body having a sliding rail fixing groove configured for mounting of the sliding rail; and a photovoltaic panel support arm connected to the frame body. The primary photovoltaic panel is mounted at a corresponding photovoltaic panel support arm.

According to embodiments of another aspect of the present disclosure, a vehicle is provided. The vehicle includes a vehicle body and the solar photovoltaic panel assembly as described above. The solar photovoltaic panel assembly is mounted at a roof of the vehicle body.

With the vehicle according to the embodiments of the present disclosure, the solar photovoltaic panel assembly uses the primary photovoltaic panel to connect the first frame and the second frame. Moreover, there is no need to provide the frame for connecting the first frame and the second frame. Therefore, it is beneficial to the reduction of the total weight of the support frame, and the realization of the lightweight design of the overall structure of the solar photovoltaic panel assembly.

According to embodiments of yet another aspect of the present disclosure, an electric device is provided. The electric device includes the solar photovoltaic panel assembly as described above.

With the electric device according to the embodiments of the present disclosure, the solar photovoltaic panel assembly uses the primary photovoltaic panel to connect the first frame and the second frame, without the need to provide the frame for connecting the first frame and the second frame. Therefore, it is conducive to the reduction of the total weight of the support frame, and the realization of the lightweight design of the overall structure of the solar photovoltaic panel assembly.

Additional aspects and advantages of the present disclosure will be provided in part in the following description, or will become apparent in part from the following description, or can be learned from practicing of the present disclosure.

BRIEF DESCRIPTION OF THE DRAWINGS

FIG. 24 is a schematic perspective view of a second frame;

FIG. 25 is a schematic view of a second frame, a sliding rail, and an angle support;

FIG. 26 is a schematic view of a sliding rail at a storage position;

Figure 1:
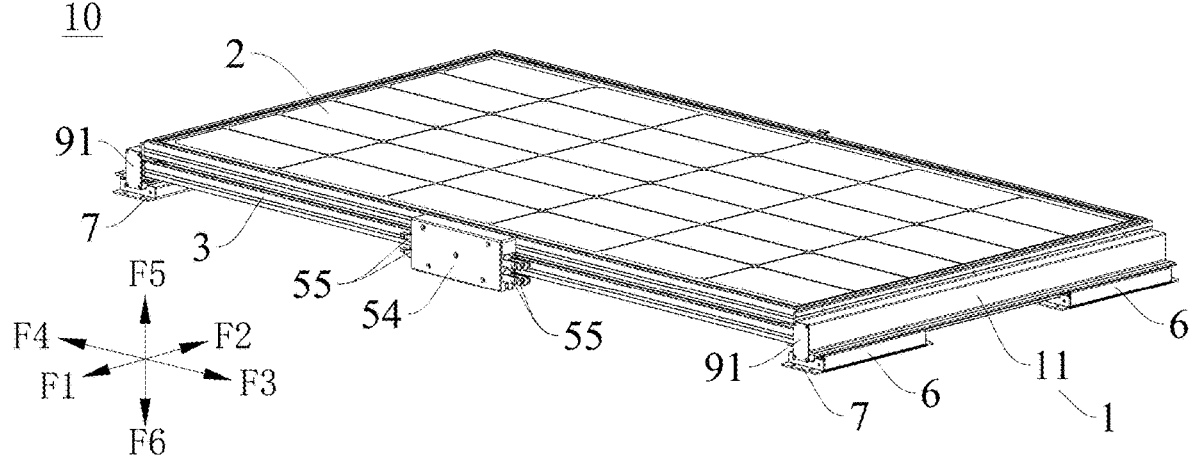
FIG. 1 is a schematic front view of a solar photovoltaic panel assembly (at a storage position) according to an embodiment of the present disclosure.

REFERENCE NUMERALS vehicle 100, solar photovoltaic panel assembly 10, support frame 1, first frame 11, second frame 12, frame body 13, photovoltaic panel support arm 14, transverse support arm 141, vertical support arm 142, wing mounting arm 15, mounting hole 151, sliding rail fixing groove 16, primary photovoltaic panel 2, primary photovoltaic frame 21, primary thread hole 211, transverse supporting arm 212, vertical supporting arm 213, primary photovoltaic lamination structure 22, primary photovoltaic positive wire 23, primary photovoltaic negative wire 24, secondary photovoltaic panel 3, secondary photovoltaic frame 31, secondary photovoltaic lamination structure 32, secondary photovoltaic positive wire 33, secondary photovoltaic negative wire 34, drive member 4, drive mechanism 41, drive motor 411, first lead screw segment 412, final lead screw segment 413, telescopic rod storage compartment 414, rocker insertion opening 415, telescopic rod 42, first telescopic rod segment 421, first nut segment 4211, final telescopic rod segment 422, final nut segment 4221, reserved emergency hole 423, fixing nut 43, first fixing support 51, support body 511, support arm 512, first support hole 513, second fixing support 52, second support hole 521, junction box 53, junction box waterproof cover 54, plug connector 55, positive plug connector 551, primary-photovoltaic positive plug connector 5511, secondary-photovoltaic positive plug connector 5512, negative plug connector 552, primary-photovoltaic negative plug connector 5521, secondary-photovoltaic negative plug connector 5522, parallel plug 56, positive parallel plug 561, negative parallel plug 562, emergency limiting lock 57, limiting lock housing 571, limiting lock hole 572, reset key 573, lock tongue 574, waterproof plug 58, fixed wing 6, adhesive accommodation groove 61, reserved screw site 62, fastener groove site 63, main body groove site 64, adhesive accommodation arm 65, wing fixing support 7, first support plate 71, support plate hole 711, second support plate 72, fixing hole 721, sliding rail 8, first sliding rail section 81, middle sliding rail section 82, final sliding rail section 83, first shield 91, angle support 92, second shield 93, vehicle body 20, top transverse edge 201, top longitudinal edge 202.

DETAILED DESCRIPTION

Embodiments of the present disclosure will be described in detail below with reference to examples thereof as illustrated in the accompanying drawings, throughout which same or similar elements, or elements having same or similar functions, are denoted by same or similar reference numerals. The embodiments described below with reference to the drawings are illustrative merely, and are intended to explain, rather than limiting, the present disclosure.

In the description of the present disclosure, terms "first" and "second" are only used for description purposes, and cannot be understood as indicating or implying relative importance or implying the number of indicated technical features. Furthermore, the feature associated with "first" and "second" may include one or more this feature distinctly or implicitly. In the description of the present disclosure, "a plurality of" means two or more than two, unless specified otherwise.

According to the embodiments of the present disclosure, a solar photovoltaic panel assembly 10, a vehicle 100 including the solar photovoltaic panel assembly 10, and an electric device including the solar photovoltaic panel assembly 10 are described in detail below with reference to FIG. 1 to FIG. 28.

The solar photovoltaic panel assembly 10 according to the embodiments of the present disclosure is applicable to the vehicle 1000 such as a recreational vehicle and other electric devices such as a roof of a house as desired. For ease of description, a structure of the solar photovoltaic panel assembly 10 is explained below by taking the application of the solar photovoltaic panel assembly 10 to the vehicle 100 as an example.

With reference to FIG. 1 to FIG. 3, FIG. 5, FIG. 7, and FIG. 11, the solar photovoltaic panel assembly 10 according to the embodiments of the present disclosure may include a support frame 1, a primary photovoltaic panel 2, and a secondary photovoltaic panel 3.

The support frame 1 is a split-type frame and includes a first frame 11 and a second frame 12. The first frame 11 is arranged opposite to the second frame 12. The primary photovoltaic panel 2 is located between the first frame 11 and the second frame 12, and the first frame 11 is connected to the second frame 12 by the primary photovoltaic panel 2. The secondary photovoltaic panel 3 is located between the first frame 11 and the second frame 12. The secondary photovoltaic panel 3 is slidable along the first frame 11 and/or the second frame 12 into a storage position at which the secondary photovoltaic panel 3 has a maximum overlapping area with the primary photovoltaic panel 2 in a thickness direction and a deployment position at which the secondary photovoltaic panel 3 slides outwardly relative to the primary photovoltaic panel 2.

Figure 2:
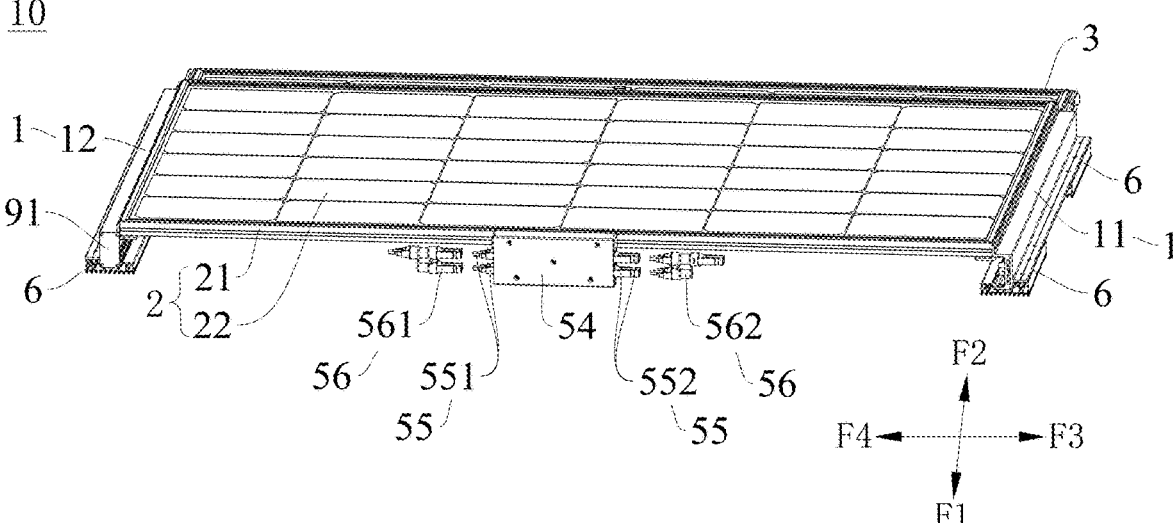
FIG. 2 is a schematic front view of a solar photovoltaic panel assembly and a parallel plug (at a partial deployment position) according to an embodiment of the present disclosure.

In other words, a photovoltaic panel mounting space is formed between the first frame 11 and the second frame 12, and the primary photovoltaic panel 2 and the secondary photovoltaic panel 3 are each located in the photovoltaic panel mounting space. The primary photovoltaic panel 2 has an end (an F3 end as shown in FIG. 2) connected to the first frame 11 and another end (an F4 end as shown in FIG. 2) connected to the second frame 12. The first frame 11 is connected to the second frame 12 only by the primary photovoltaic panel 2, without requiring other frames. A traditional support frame adopts a structure in which the photovoltaic panel is fully surrounded by frames on all sides, which increases a cost and mounting difficulty of the solar photovoltaic panel assembly. In order to lower the cost and mounting difficulty, an optimization design is performed on a structure of the support frame 1 in the present disclosure. The primary photovoltaic panel 2 is used as a connection frame to connect the primary photovoltaic panel 2 to the first frame 11 and the second frame 12. When the solar photovoltaic panel assembly 10 needs to be mounted on a surface of a base, the first frame 11 and the second frame 12 only need to be fixed on the surface of the base.

Figures 3, 4:
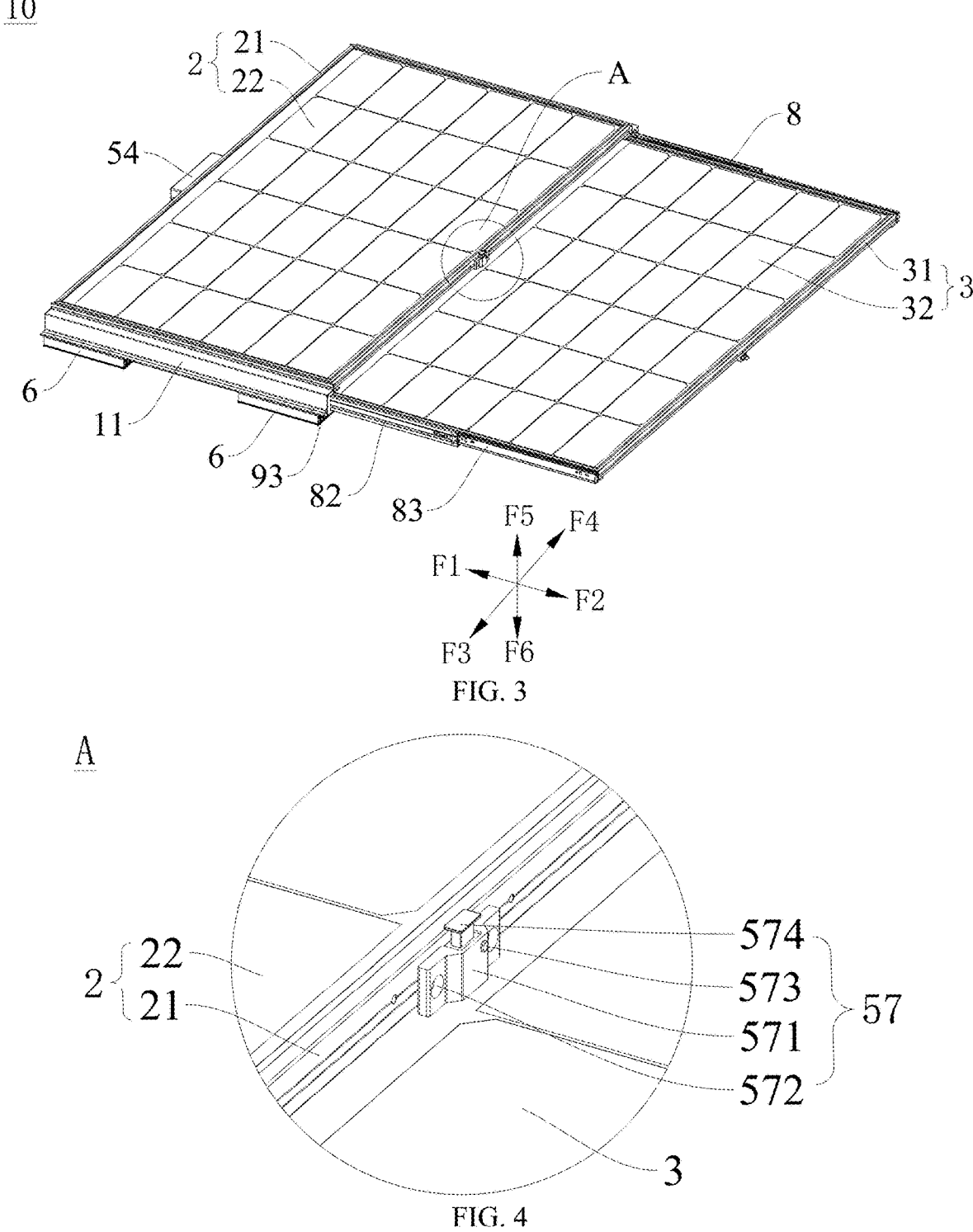
FIG. 3 is a schematic front view of a solar photovoltaic panel assembly (at a full deployment position) from a viewing angle according to an embodiment of the present disclosure.
FIG. 4 is a schematic partially enlarged view at A in FIG. 3.
Figures 5, 6:
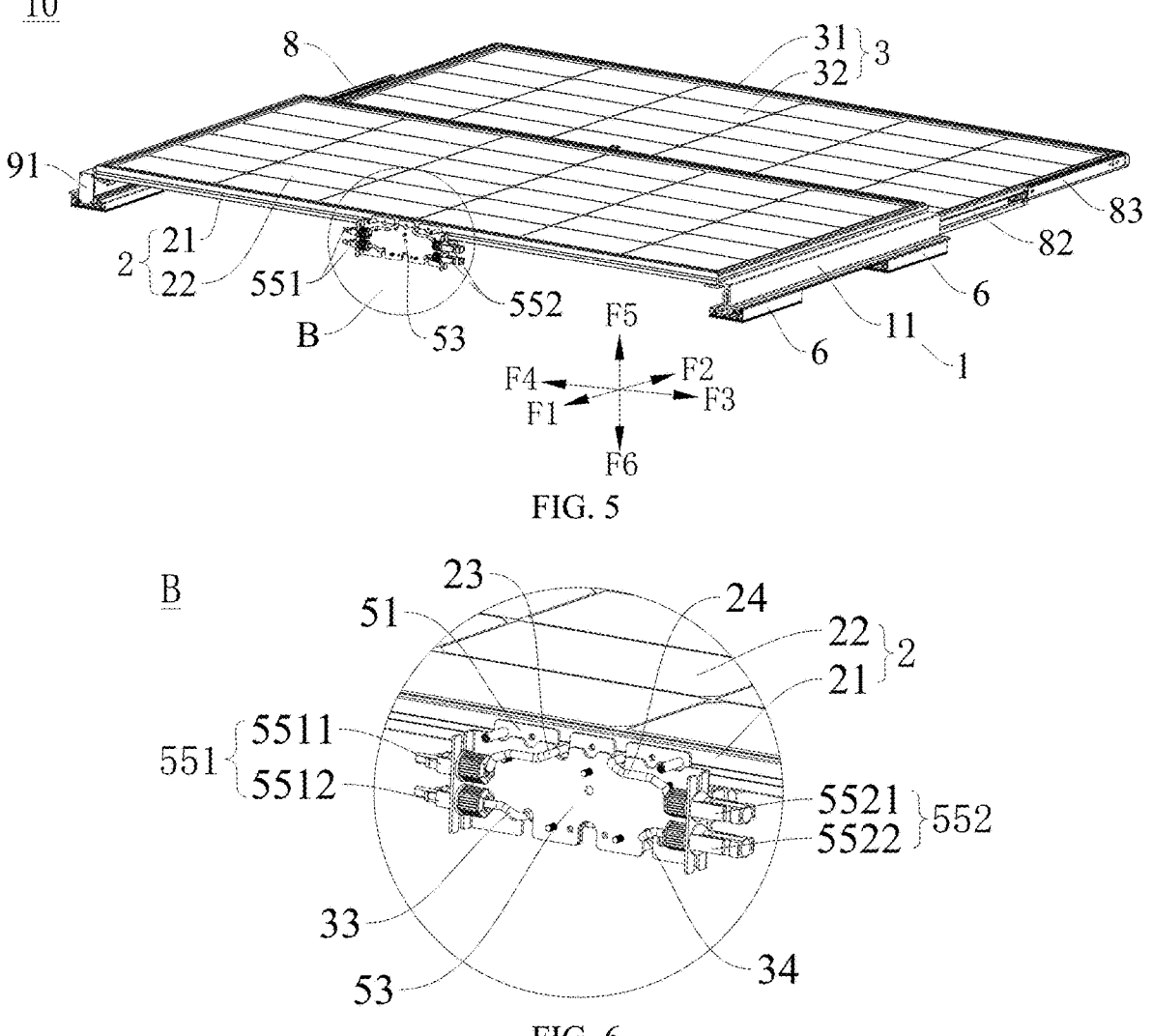
FIG. 5 is a schematic front view of a solar photovoltaic panel assembly (at a full deployment position) from another viewing angle according to an embodiment of the present disclosure.
FIG. 6 is a schematic partially enlarged view at B in FIG. 5.
Figures 7, 8, 9:
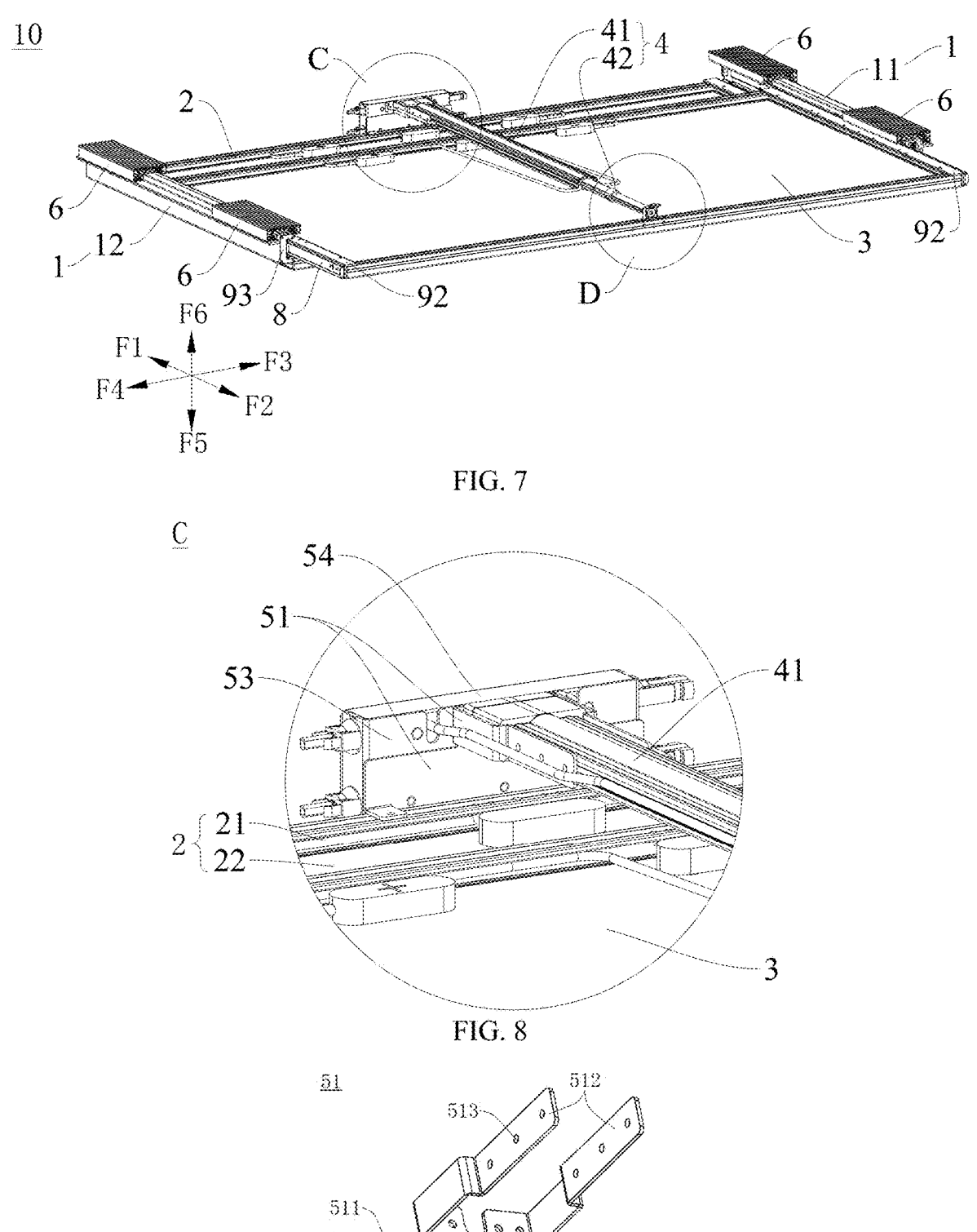
FIG. 7 is a schematic back view of a solar photovoltaic panel assembly (at a partial deployment position) according to an embodiment of the present disclosure.
FIG. 8 is a schematic partially enlarged view at C in FIG. 7.
FIG. 9 is a schematic perspective view of a first fixing support.
Figure 11:
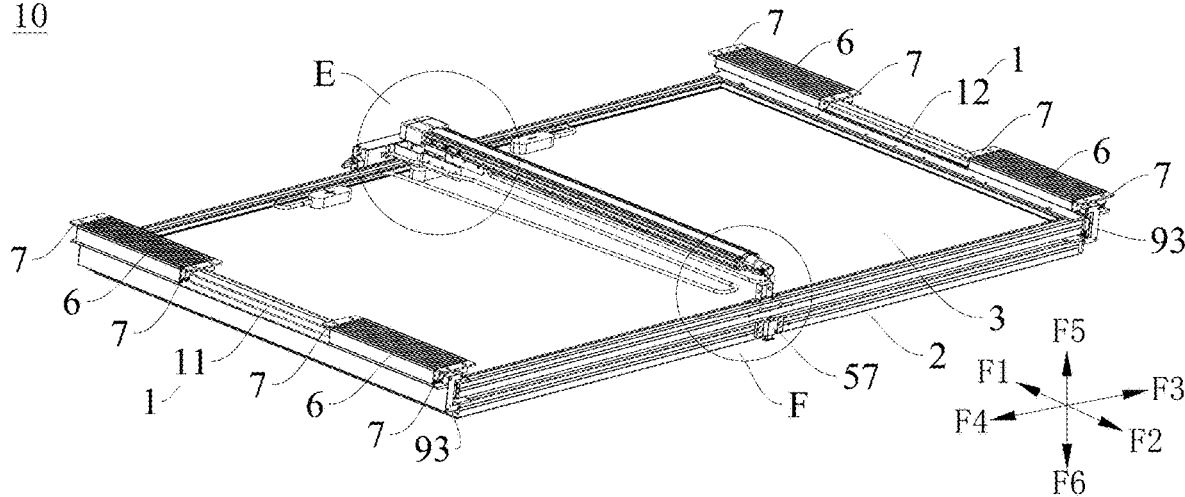
FIG. 11 is a schematic back exploded view of a solar photovoltaic panel assembly (at a storage position) according to an embodiment of the present disclosure.
Figure 12:
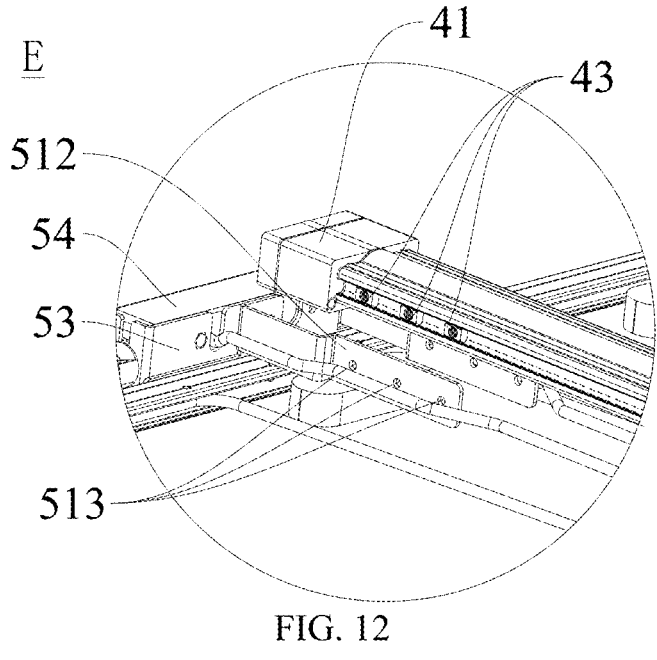
FIG. 12 is a schematic partially enlarged view at E in FIG. 11.

The secondary photovoltaic panel 3 is slidable along the first frame 11 and/or the second frame 12 to the storage position and the deployment position. A position of the secondary photovoltaic panel 3 shown in FIG. 1 and FIG. 11 is the storage position, and a position of the secondary photovoltaic panel 3 shown in FIG. 2, FIG. 3, FIG. 5, and FIG. 7 is the deployment position. Moreover, a position of the secondary photovoltaic panel 3 shown in FIG. 2 and FIG. 7 is a partial deployment position, and a position of the secondary photovoltaic panel 3 shown in FIG. 3 and FIG. 5 is a full deployment position. Optionally, the secondary photovoltaic panel 3 slides only along the first frame 11 to the storage position and the deployment position, or only along the second frame 12 to the storage position and the deployment position, or simultaneously along the first frame 11 and the second frame 12 to the storage position and the deployment position.

The first frame 11 and the second frame 12 serve as a bearing member for bearing the primary photovoltaic panel 2 and the secondary photovoltaic panel 3, and play a fixing and supporting role for the primary photovoltaic panel 2 and the secondary photovoltaic panel 3. Meanwhile, the primary photovoltaic panel 2 serves to connect the first frame 11 to the second frame 12, so that the solar photovoltaic panel assembly 10 is formed as a whole. Therefore, carrying, assembly and disassembly of the solar photovoltaic panel assembly 10 as a whole are facilitated. The solar photovoltaic panel assembly 10 of the present disclosure has a stable and reliable structure, long service life, and good use effect.

The primary photovoltaic panel 2 and the secondary photovoltaic panel 3 are laminated to each other in a thickness direction, i.e., a large surface (i.e., a surface with a large area) of the primary photovoltaic panel 2 and a large surface (i.e., a surface with a large area) of the secondary photovoltaic panel 3 are arranged opposite to each other. In this way, a space in a thickness direction of the support frame 1 can be reasonably utilized, making an overall thickness of the solar photovoltaic panel assembly 10 small in size, without occupying a height space too much. For example, a size of the vehicle 100 in a height direction of the vehicle 100 is not significantly increased when the solar photovoltaic panel assembly 10 is mounted on a vehicle body 20 of the vehicle 100, so that the solar photovoltaic panel assembly 10 has less influence on trafficability of the vehicle 100. Thickness directions of the support frame 1, the primary photovoltaic panel 2, and the secondary photovoltaic panel 3 are in an F5-F6 direction shown in FIG. 1, FIG. 3, FIG. 5, FIG. 7, and FIG. 11.

Optionally, the primary photovoltaic panel 2 is of a plate-shaped structure, and has a large surface perpendicular to the thickness direction of the support frame 1. The primary photovoltaic panel 2 is fixed to the first frame 11 and the second frame 12, i.e., the primary photovoltaic panel 2 and the first frame 11 and the second frame 12 are arranged in a non-slidable structure form to one another, to reduce a number of slidable members in the solar photovoltaic panel assembly 10.

Similarly, the secondary photovoltaic panel 3 is of a plate-shaped structure, and has a large surface perpendicular to the thickness direction of the support frame 1.

When the secondary photovoltaic panel 3 is located at the storage position, as shown in FIG. 1 and FIG. 11, the secondary photovoltaic panel 3 has the maximum overlapping area with the primary photovoltaic panel 2 in the thickness direction of the support frame 1, i.e., the secondary photovoltaic panel 3 can overlap with the primary photovoltaic panel 2 to the greatest extent. When located at the deployment position, the secondary photovoltaic panel 3 slides outwardly relative to the primary photovoltaic panel 2. Specifically, the secondary photovoltaic panel 3 may slide outwardly relative to the primary photovoltaic panel 2 partially, for example, to the partial deployment position shown in FIG. 2 and FIG. 7; or the secondary photovoltaic panel 3 may also slide outwardly relative to the primary photovoltaic panel 2 totally, for example, to the full deployment position shown in FIG. 3 and FIG. 5.

When the secondary photovoltaic panel 3 slides outwardly relative to the primary photovoltaic panel 2, the overlapping area of the secondary photovoltaic panel 3 with the primary photovoltaic panel 2 in the thickness direction of the support frame 1 gradually decreases as a deployment degree becomes greater and greater. When the secondary photovoltaic panel 3 retracts inwardly relative to the primary photovoltaic panel 2, the overlapping area of the secondary photovoltaic panel 3 with the primary photovoltaic panel 2 in the thickness direction of the support frame 1 gradually increases as the deployment degree becomes smaller and smaller.

Areas of the primary photovoltaic panel 2 and the secondary photovoltaic panel 3 that receive irradiation of sunlight are power generation areas. When the secondary photovoltaic panel 3 is at the deployment position, a total power generation area of the primary photovoltaic panel 2 and the secondary photovoltaic panel 3 is increased, and a power generation amount is increased accordingly. When the secondary photovoltaic panel 3 is at the storage position, the total power generation area of the primary photovoltaic panel 2 and the secondary photovoltaic panel 3 is reduced, and thus the power generation amount is decreased accordingly. The secondary photovoltaic panel 3 slides outwardly to the deployment position relative to the primary photovoltaic panel 2, which can increase a power generation area and a generated power of the solar photovoltaic panel assembly 10, thereby facilitating an increase in the power generation amount to satisfy user's requirements for power utilization.

With the solar photovoltaic panel assembly 10 according to the embodiments of the present disclosure, the primary photovoltaic panel 2 is used to connect the first frame 11 and the second frame 12, without a need for providing a frame for connecting the first frame 11 and the second frame 12. Therefore, it is conducive to a reduction in a total weight of the support frame 1 and realizing a lightweight design of an overall structure of the solar photovoltaic panel assembly 10. When the solar photovoltaic panel assembly 10 is applied to the vehicle 100 or other electric devices, energy consumption of the vehicle 100 does not increase much.

According to some embodiments of the present disclosure, the secondary photovoltaic panel 3 is located at a side of the primary photovoltaic panel 2 facing towards a mounting base. When the secondary photovoltaic panel 3 is in the storage position, the primary photovoltaic panel 2 may shield the secondary photovoltaic panel 3 to the greatest extent. When the secondary photovoltaic panel 3 is in a non-full deployment position, the primary photovoltaic panel 2 may partially shield the secondary photovoltaic panel 3. The shielding of the primary photovoltaic panel 2 may prevent debris from above from falling into a sliding rail of the secondary photovoltaic panel 3, to protect a sliding movement of the secondary photovoltaic panel 3, allowing the secondary photovoltaic panel 3 to slide more steadily and smoothly.

In an embodiment, one secondary photovoltaic panel 3 is provided, a two-layer photovoltaic panel structure is formed by the secondary photovoltaic panel 3 and the primary photovoltaic panel 2. As a result, the thickness of the solar photovoltaic panel assembly 10 is not significantly increased, and thus a height of the vehicle 100 is not significantly increased when the solar photovoltaic panel assembly 10 is mounted on the vehicle body 20 of the vehicle 100, so that the solar photovoltaic panel assembly 10 has less influence on the trafficability of the vehicle 100. A thickness direction of the solar photovoltaic panel assembly 10 is the same as the thickness direction of the support frame 1, and the thickness direction of the solar photovoltaic panel assembly 10 and the thickness direction of the support frame 1 are each in the F5-F6 direction shown in FIG. 1, FIG. 3, FIG. 5, FIG. 7, and FIG. 11.

In some embodiments, the solar photovoltaic panel assembly 10 is applied to the vehicle 100. In an embodiment, the solar photovoltaic panel assembly 10 is mounted on the vehicle body 20 of the vehicle 100, and the secondary photovoltaic panel 3 is located at a side of the primary photovoltaic panel 2 facing towards the vehicle body 20 of the vehicle 100. When the vehicle 100 is driving, an additional secondary photovoltaic panel 3 may be hidden under an uppermost primary photovoltaic panel 2 to improve driving safety of the vehicle 100. When the vehicle 100 stops moving, the hidden secondary photovoltaic panel 3 may be extended outwards through the drive member 4, thereby realizing a purpose of increasing the generated power.

In addition, the solar photovoltaic panel assembly 10 is designed as a two-layer structure including the primary photovoltaic panel 2 and the secondary photovoltaic panel 3, may be made into a structure with a suitable size and weight to meet the demand for additional power generation, and has better practicability. Moreover, the solar photovoltaic panel assembly 10 is designed as the two-layer structure, and a height of the solar photovoltaic panel assembly 10 does not increase too much.

In an embodiment, the primary photovoltaic panel 2 and the secondary photovoltaic panel 3 are constructed as the two-layer structure, and are solar photovoltaic panels of a same size. A power of the primary photovoltaic panel 2 is 195 W. A power of the secondary photovoltaic panel 3 is 195 W. The solar photovoltaic panel assembly 10 has a total power close to 400 W.

Of course, regardless of the above factors, in other some embodiments of the present disclosure, a plurality of secondary photovoltaic panels 3, such as two, three, or more secondary photovoltaic panels 3, may be provided. In this way, the secondary photovoltaic panel 3 can slide to the deployment position as requirement of a user, to increase the power generation area of the solar photovoltaic panel assembly 10.

In some embodiments of the present disclosure, the solar photovoltaic panel assembly 10 further includes a drive member 4. The drive member 4 is fixedly mounted to the primary photovoltaic panel 2 and configured to drive the secondary photovoltaic panel 3 to slide. In some embodiments, the drive member 4 is an electrical cylinder to push the secondary photovoltaic panel 3 to slide outwardly relative to the primary photovoltaic panel 2, or pull the secondary photovoltaic panel 3 to retract inwardly relative to the primary photovoltaic panel 2. A movement of the secondary photovoltaic panel 3 may be automated by providing the drive member 4, which is conducive to an improvement in user experience.

According to some embodiments of the present disclosure, referring to FIG. 7, FIG. 8, and FIG. 10 to FIG. 17, the drive member 4 is in a form of an electrical telescopic rod and includes a drive mechanism 41 and a multi-segmented telescopic rod 42. The multi-segmented telescopic rod 42 at least includes a first telescopic rod segment 421 and a final telescopic rod segment 422. The drive mechanism 41 is fixedly mounted at the primary photovoltaic panel 2. An end of the first telescopic rod segment 421 is located in the drive mechanism 41. Two adjacent telescopic rod segments of the multi-segmented telescopic rod 42 are nested to each other. The final telescopic rod segment 422 is fixedly connected to the secondary photovoltaic panel 3. The drive mechanism 41 is capable of driving the multi-segmented telescopic rod 42 to be extended away from or retracted towards the drive mechanism 41. The drive mechanism 41 includes a drive motor 411 and a telescopic rod storage compartment 414. The drive motor 411 is mounted in an internal space of the telescopic rod storage compartment 414. When the multi-segmented telescopic rod 42 is extended outwardly relative to the telescopic rod storage compartment 414, the multi-segmented telescopic rod 42 pushes the secondary photovoltaic panel 3 to slide outwardly. When the multi-segmented telescopic rod 42 is retracted inwardly relative to the telescopic rod storage compartment 414, the multi-segmented telescopic rod 42 pulls the secondary photovoltaic panel 3 to retract inwardly. The electrical telescopic rod 42 allows for an automatic sliding action of the secondary photovoltaic panel 3, thereby saving a user's physical power. Optionally, when the drive motor 411 rotates forwardly, the multi-segmented telescopic rod 42 may be driven to be extended outwardly. When the drive motor 411 rotates reversely, the multi-segmented telescopic rod 42 may be driven to be retracted inwardly.

According to some embodiments of the present disclosure, the multi-segmented telescopic rod 42 is of a rod-shaped structure, and an extendable direction of each telescopic rod segment of the multi-segmented telescopic rod 42 is parallel to a sliding-out direction of the secondary photovoltaic panel 3. In the related art, the solar photovoltaic panel assembly includes the primary photovoltaic panel and the secondary photovoltaic panel. Sliding of the secondary photovoltaic panel is realized through a traditional electrical push rod. The traditional electrical push rod includes a first push rod segment. A length extended direction of the push rod is parallel to the sliding-out direction of the secondary photovoltaic panel. If the push rod needs to be pushed by one meter of travel, an overall length of the push rod needs to be 20 centimeters longer than the travel. This leads to the need for a larger volume of the frame to accommodate the electrical push rod, which directly increases the frame and affects a volume and weight of the finished product, thereby bringing great difficulties for product mounting. If a travel of 700 mm is required, the overall length of the push rod will reach 855 mm, i.e., a range of travel that may be achieved by the push rod is smaller than the overall length of the push rod itself. In the present disclosure, by arranging the telescopic rod 42 in multiple segments, an overall length of the drive member 4 may be shortened. For example, the overall length of the drive member 4 is 690 mm, but the travel may reach 730 mm, i.e., the drive member 4 of the present disclosure may achieve a greater travel range than the overall length of the drive member 4 itself due to the provision of the multi-segmented telescopic rod 42. Meanwhile, an extendable direction of each telescopic rod segment of the multi-segmented telescopic rod 42 is parallel to the sliding-out direction of the secondary photovoltaic panel 3. Therefore, a driving force exerted by the telescopic rod 42 on the secondary photovoltaic panel 3 is consistent with the sliding-out direction of the secondary photovoltaic panel 3, and the secondary photovoltaic panel 3 is not prone to deflection and stuttering, which is conducive to ensuring that sliding smoothness of the secondary photovoltaic panel 3 is good.

In addition, a thickness of the traditional electrical push rod is 40 mm, while a thickness of the drive member 4 used in the present disclosure is only 25 mm, which becomes significantly thinner. A weight of the drive member 4 used in the present disclosure is lighter than a weight of the traditional electrical push rod. A noise of the traditional electrical push rod in an operation state is compared with a noise of the drive member 4 used in the present disclosure under an operation state, and the noise of the drive member 4 used in the present disclosure is smaller during the operation.

In some embodiments of the present disclosure, the drive member 4 may be a direct-current electrical telescopic rod and have characteristics of a long extended length, a slow rotational speed, a large torque, and is rotatable forwardly and reversely through current reversing.

In some embodiments of the present disclosure, with reference to FIG. 7, FIG. 8, and FIG. 10 to FIG. 13, the drive member 4 is located at a side of the secondary photovoltaic panel 3 facing away from the primary photovoltaic panel 2. In this way, the primary photovoltaic panel 2 and the secondary photovoltaic panel 3 can shield the drive member 4 to the greatest extent, and debris above the primary photovoltaic panel 2 can be prevented from falling on the drive member 4, so that protection on an extendable action of the telescopic rod 42 is realized, enabling the extendable action of the telescopic rod 42 to be made stabler and smoother. The solar photovoltaic panel assembly 10 also includes a first fixing support 51 and a second fixing support 52. The drive mechanism 41 is fixedly mounted at the primary photovoltaic panel 2 through the first fixing support 51, and the final telescopic rod segment 422 is fixedly mounted at the secondary photovoltaic panel 3 through the second fixing support 52.

Referring to FIG. 7 to FIG. 9, and FIG. 11 and FIG. 12, the first fixing support 51 includes a support body 511 and a support arm 512. The support body 511 is fixedly mounted at the primary photovoltaic panel 2. The support arm 512 is connected to the support body 511, and is extended towards the sliding-out direction of the secondary photovoltaic panel 3. The drive mechanism 41 is provided with a fixing nut 43. The support arm 512 has a first support hole 513 corresponding to a position of a threaded hole of the fixing nut 43. A bolt passes through the first support hole 513 to be fastened in the threaded hole of the fixing nut 43. Therefore, connection and fixation of the first fixing support 51 and the drive mechanism 41 are realized.

Optionally, the fixing nut 43 may be placed in a groove at an outer surface of the drive mechanism 41. A number of the fixing nuts 43 may be a plurality. The groove at the outer surface of the drive mechanism 41 extends along the sliding-out direction of the secondary photovoltaic panel 3. The plurality of fixing nuts 43 are arranged dispersedly along the sliding-out direction of the secondary photovoltaic panel 3, and the first support holes 513 correspond to the fixing nuts 43 in one-to-one correspondence. Therefore, it is beneficial to an enhancement in connection firmness of the first fixing support 51 and the drive mechanism 41.

Referring to FIG. 7, FIG. 10, FIG. 11, and FIG. 13, the second fixing support 52 may be fastened onto the secondary photovoltaic panel 3 through the bolt. The second fixing support 52 has a second support hole 521 defined thereon, and the bolt passes through the second support hole 521 to be fastened into the threaded hole of the final telescopic rod segment 422. Therefore, connection and fixation of the final telescopic rod segment 422 and the second fixing support 52 are realized. Optionally, a number of the second support holes 521 may be a plurality. Therefore, it is beneficial to an enhancement in connection firmness of the final telescopic rod segment 422 and the second fixing support 52.

Figure 13:
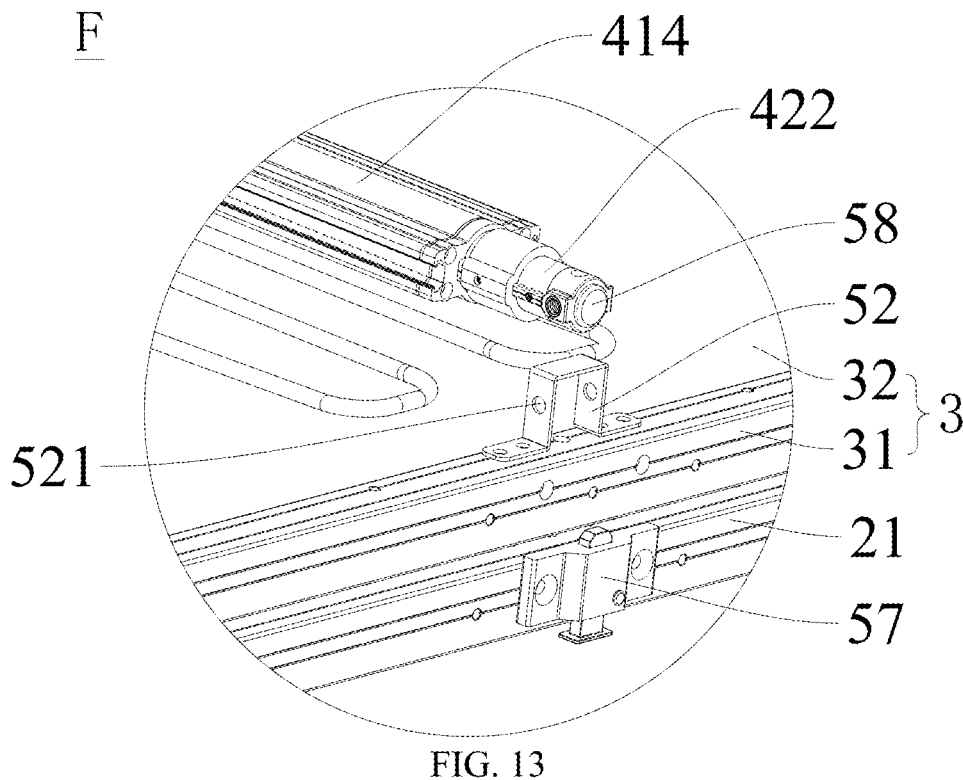
FIG. 13 is a schematic partially enlarged view at F in FIG. 11.
Figures 14, 15:
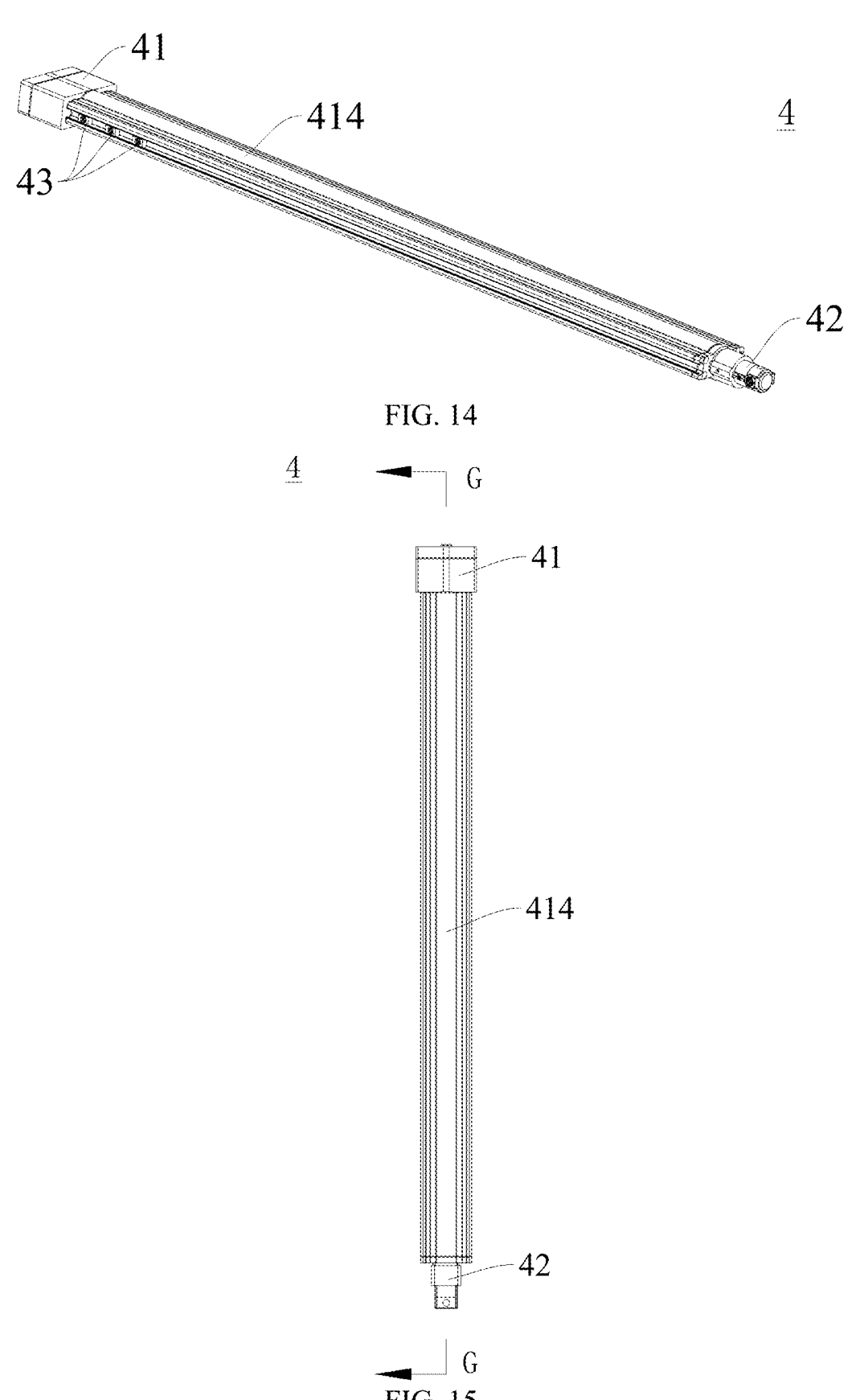
FIG. 14 is a schematic perspective view of a drive member (a telescopic rod is in a retracted position)
FIG. 15 is a main view of a drive member (a telescopic rod is in a retracted position)
Figure 16:
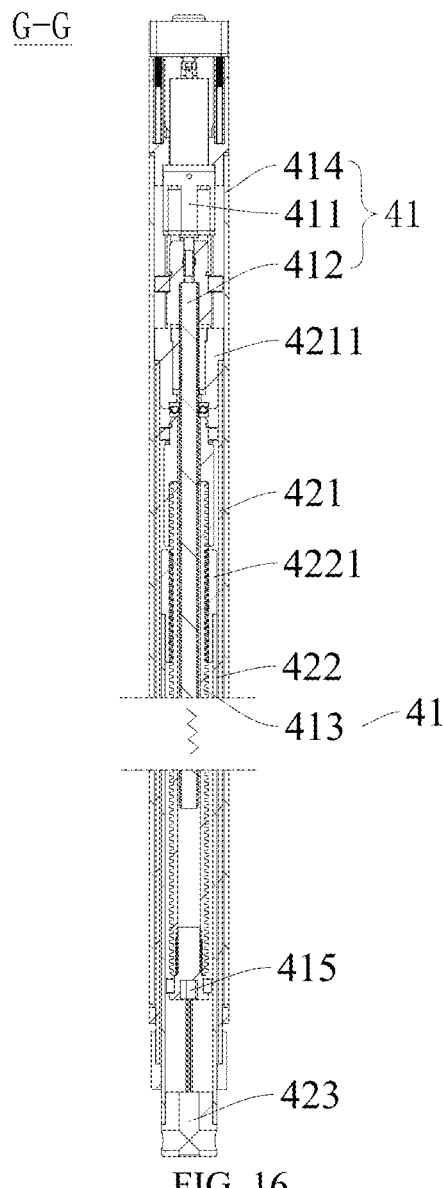
FIG. 16 is a schematic sectional view taken along G-G in FIG. 15.
Figure 17:
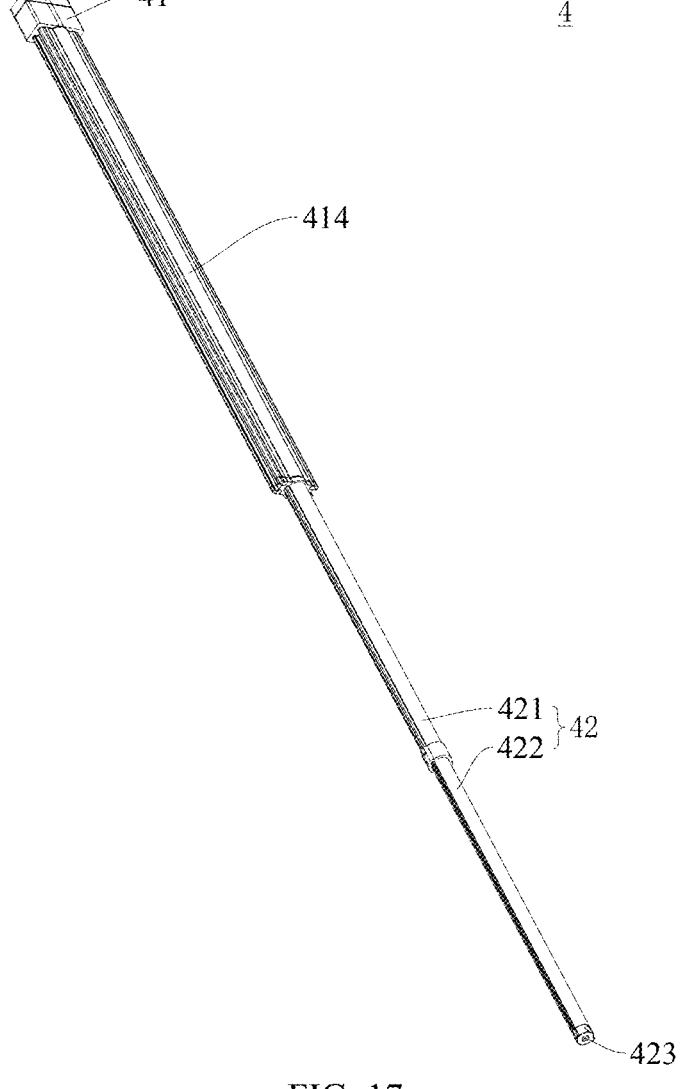
FIG. 17 is a schematic perspective view of a drive member (a telescopic rod is in an extended position)

In some embodiments of the present disclosure, each of the primary photovoltaic panel 2 and the secondary photovoltaic panel 3 includes a photovoltaic frame and a photovoltaic lamination structure. The photovoltaic frame is disposed around an outer periphery of the photovoltaic lamination structure. The photovoltaic lamination structure is a lamination structure of tempered glass, an ethylene-vinyl acetate (EVA) film, a battery piece, and a backboard. The drive mechanism 41 is fixedly mounted at the photovoltaic frame of the primary photovoltaic panel 2 through the first fixing support 51, and the final telescopic rod segment 422 is fixedly mounted at the photovoltaic frame of the secondary photovoltaic panel 3 through the second fixing support 52. Specifically, referring to FIG. 8 and FIG. 9, the primary photovoltaic panel 2 includes a primary photovoltaic frame 21 and a primary photovoltaic lamination structure 22. The primary photovoltaic lamination structure 22 is fixedly mounted to the primary photovoltaic frame 21, and the support body 511 is fixedly mounted to the primary photovoltaic frame 21. Referring to FIG. 13, the secondary photovoltaic panel 3 includes a secondary photovoltaic frame 31 and a secondary photovoltaic lamination structure 32. The secondary photovoltaic lamination structure 32 is fixedly mounted to the secondary photovoltaic frame 31, and the second fixing support 52 is fixedly mounted to the secondary photovoltaic frame 31.

Optionally, the photovoltaic frame is constructed as a framed structure circumferentially closed and penetrated in the thickness direction, and the photovoltaic lamination structure is mounted in a space surrounded by the photovoltaic frame circumferentially. Specifically, the primary photovoltaic lamination structure 22 is mounted in a space surrounded by the primary photovoltaic frame 21 circumferentially, and the secondary photovoltaic lamination structure 32 is mounted in a space surrounded by the secondary photovoltaic frame 31 circumferentially.

In some embodiments of the present disclosure, the primary photovoltaic panel 2 and the secondary photovoltaic panel 3 have a same structure. Specifically, the primary photovoltaic panel 2 and the secondary photovoltaic panel 3 are the same both in size and model. Further, when the secondary photovoltaic panel 3 is at the full deployment position, the primary photovoltaic panel 2 and the secondary photovoltaic panel 3 have the greatest total power generation area that is a total power generation area of the two photovoltaic panels; and when the secondary photovoltaic panel 3 is at the storage position, the total power generation area of the primary photovoltaic panel 2 and the secondary photovoltaic panel 3 is reduced to a power generation area of one photovoltaic panel. When the secondary photovoltaic panel 3 is at the deployment position, the generated power of the solar photovoltaic panel assembly 10 can be increased. For example, the generated power of the solar photovoltaic panel assembly 10 can be increased up to 1 time to 2 times.

In some embodiments of the present disclosure, the photovoltaic frame has a profile with a thickness ranging from 1.5 mm to 4 mm, and the photovoltaic frame has a threaded hole defined thereon. The solar photovoltaic panel assembly 10 further includes a photovoltaic fastening bolt. The photovoltaic fastening bolt penetrates the first frame 11 or the second frame 12 to be fastened into the threaded hole.

Figures 18, 19, 20:
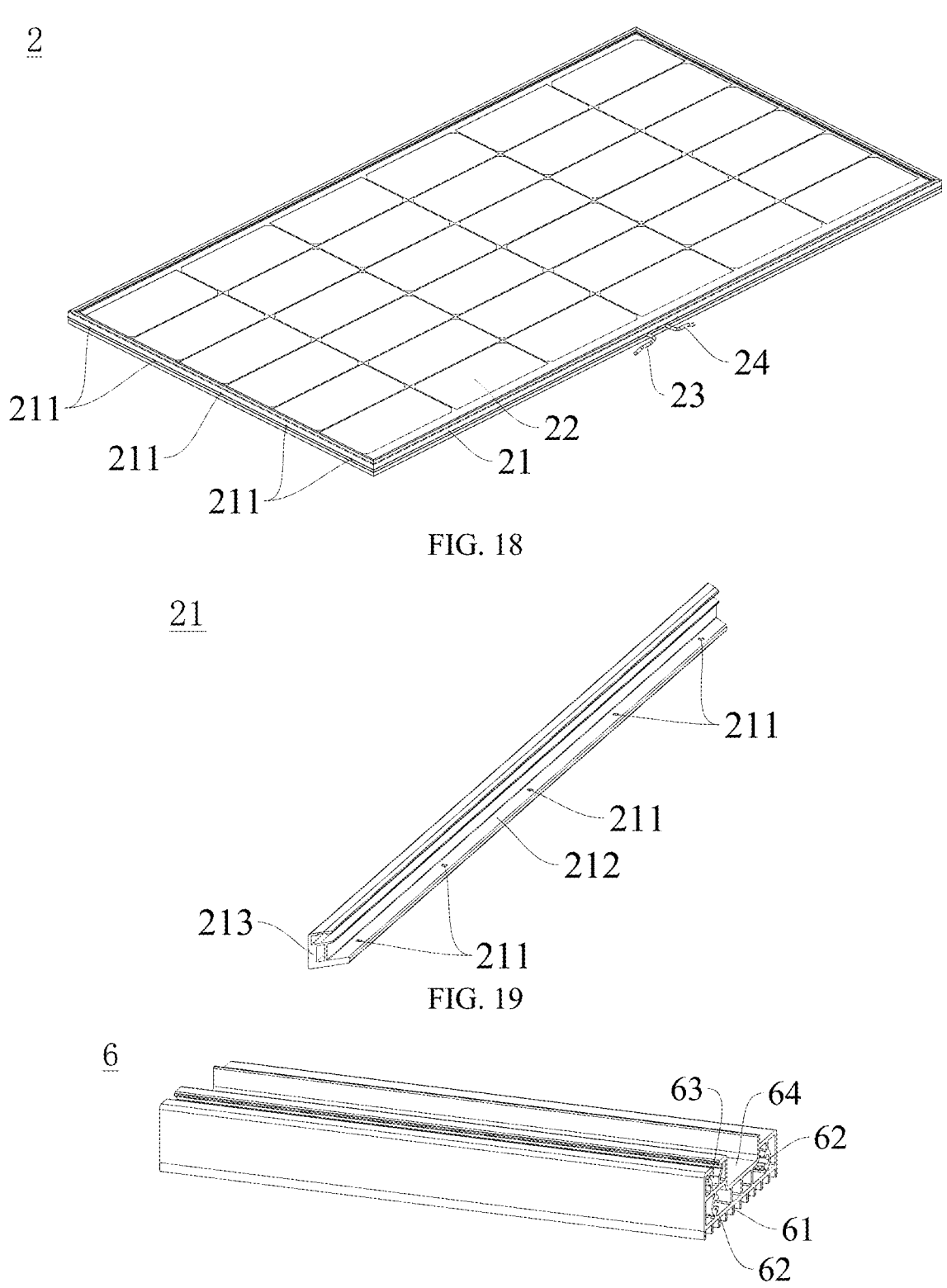
FIG. 18 is a schematic perspective view of a primary photovoltaic panel.
FIG. 19 is a schematic perspective view of a primary photovoltaic frame.
FIG. 20 is a schematic perspective view of a fixed wing in a viewing angle.

Optionally, the profile thickness of the photovoltaic frame may be 1.5 mm, 2 mm, 2.5 mm, 3 mm, 3.5 mm, or 4 mm. Of course, the profile thickness of the photovoltaic frame may also be other values in the range from 1.5 mm to 4 mm, and examples are omitted herein. The profile thickness of the photovoltaic frame is in the range from 1.5 mm to 4 mm, and the threaded hole may be directly machined on the photovoltaic frame without placing the nut additionally, thus making mounting between the photovoltaic frame and the support frame 1 more convenient. Referring to FIG. 18 and FIG. 19, the primary photovoltaic frame 21 includes a transverse supporting arm 212 and a vertical supporting arm 213. Each of the transverse supporting arm 212 and the vertical supporting arm 213 has a primary threaded hole 211 defined thereon. The photovoltaic fastening bolt passes through the first frame 11 to be fastened into the corresponding primary threaded hole 211, so that connection and fixation of the primary photovoltaic frame 21 and the first frame 11 may be completed.

Optionally, the photovoltaic frame may be a formed part made of an aluminum profile, a formed part made of a copper profile, or the like.

Optionally, a height of the photovoltaic frame ranges from 16 mm to 25 mm, i.e., a size of the photovoltaic frame in the thickness direction of the solar photovoltaic panel assembly 10 ranges from 16 mm to 25 mm. For example, the height of the photovoltaic frame may be 16 mm, 18 mm, 20 mm, 23 mm, or 25 mm. Of course, the height of the photovoltaic frame may also be other values in the range from 16 mm to 25 mm, and given examples are omitted herein. Compared with the traditional photovoltaic panel having a thickness of 35 mm or more, the height of the photovoltaic frame of the present disclosure is significantly reduced, which is conducive to thinning of the overall thickness of the photovoltaic panel, thereby facilitating the lightweight design of the solar photovoltaic panel assembly 10.

The drive member 4 according to the embodiments of the present disclosure is mounted in an intermediate position between the first frame 11 and the second frame 12. Therefore, damage to the telescopic rod 42 or the secondary photovoltaic panel 3, which is caused by an offset of the secondary photovoltaic panel 3 because of a halt in the secondary photovoltaic panel 3 during the sliding, can be prevented.

According to some embodiments of the present disclosure, the first frame 11, the second frame 12, and the photovoltaic frame are each an aluminum alloy frame. In this way, the first frame 11, the second frame 12, and the photovoltaic frame each has a better strength and lighter weight, which can achieve the lightweight design of the solar photovoltaic panel assembly 10. Moreover, the use of the aluminum alloy material may also prevent problems such as rust during long-term use.

The aluminum alloy frame may be conveniently disassembled and assembled, and has a small packaging volume, a low weight, and a low transportation cost. Each of the primary photovoltaic panel 2 and the secondary photovoltaic panel 3 is of an aluminum-alloy-frame glass structure, which has a strong load bearing, firm structure, hard texture, and longer service life. A conventional photovoltaic frame of 195 W is thicker and has a height reaching 35 mm, resulting in an increase in a height of the whole product. Therefore, the solar photovoltaic panel assembly 10 of the present disclosure is specially redesigned for the photovoltaic frame. In a case where a strength of the overall photovoltaic panel is ensured to remain unchanged, the photovoltaic frame is designed to be 23 mm.

In some embodiments of the present disclosure, the solar photovoltaic panel assembly 10 further includes a junction box 53. The junction box 53 is fixed to the first fixing support 51, and the junction box 53 has a plug connector 55 provided thereon. The primary photovoltaic panel 2 and the secondary photovoltaic panel 3 are adapted to be connected to corresponding plug connectors 55. Referring to FIG. 1 and FIG. 2, and FIG. 5 and FIG. 6, the plug connector 55 includes a positive plug connector 551 and a negative plug connector 552. The positive plug connector 551 includes a primary-photovoltaic positive plug connector 5511 and a secondary-photovoltaic positive plug connector 5512. The negative plug connector 552 includes a primary-photovoltaic negative plug connector 5521 and a secondary-photovoltaic negative plug connector 5522. The primary photovoltaic panel 2 has a primary photovoltaic positive wire 23 and a primary photovoltaic negative wire 24. The secondary photovoltaic panel 3 has a secondary photovoltaic positive wire 33 and a secondary photovoltaic negative wire 34. The primary photovoltaic positive wire 23 is connected to the primary-photovoltaic positive plug connector 5511. The primary photovoltaic negative wire 24 is connected to the primary-photovoltaic negative plug connector 5521. The secondary photovoltaic positive wire 33 is connected to the secondary-photovoltaic positive plug connector 5512, and the secondary photovoltaic negative wire 34 is connected to the secondary-photovoltaic negative plug connector 5522. Specifically, the junction box 53 is fixed onto the support body 511 of the first fixing support 51. The junction box 53 is integrally fixed to the first fixing support 51, and the junction box 53 is fixed onto the primary photovoltaic frame 21.

The junction box 53 and the plug connector 55 are provided to collect the wiring. On the one hand, it is convenient for the user to be wiring, and positions of the wiring are concentrated at the junction box 53, which is conducive to an improvement in wiring efficiency. On the other hand, user's self-wiring can be avoided. In this way, it is possible to avoid a problem that fault of the product occurs because of tangling of wiring harness caused by self-wiring. The junction box 53 may gather wiring harnesses of a plurality of photovoltaic panels, which greatly facilitates an electrical connection between the plurality of photovoltaic panels. Optionally, the plug connector 55 is a conventional MC4 connector, and the primary photovoltaic positive wire 23, the primary photovoltaic negative wire 24, the secondary photovoltaic positive wire 33, and the secondary photovoltaic negative wire 34 are MC4 wires. It is only necessary to buckle the MC4 wires inherent in the photovoltaic panel into the designed junction box 53 to be locked with the MC4 connector (as shown in FIG. 6).

In some embodiments of the present disclosure, the solar photovoltaic panel assembly 10 further includes a parallel plug 56 for realizing parallel outputs of the plurality of photovoltaic panels. Therefore, a charging current can be increased to meet user's different needs. As shown in FIG. 2, the parallel plug 56 includes a positive parallel plug 561 and a negative parallel plug 562. The positive parallel plug 561 is configured to connect the primary-photovoltaic positive plug connector 5511 and the secondary-photovoltaic positive plug connector 5512 in parallel, and the negative parallel plug 562 is configured to connect the primary-photovoltaic negative plug connector 5521 and the secondary-photovoltaic negative plug connector 5522 in parallel. Optionally, the parallel plug 56 is a T-type converter.

In some embodiments of the present disclosure, referring to FIG. 1 to FIG. 3, FIG. 7 and FIG. 8, and FIG. 11 and FIG.

12, the solar photovoltaic panel assembly 10 further includes a junction box waterproof cover 54. The junction box waterproof cover 54 is adapted to be mounted and fixed to the junction box 53. A waterproof space is formed between the junction box waterproof cover 54 and the junction box 53, and a connection between the primary photovoltaic panel 2 and the plug connector 55 corresponding to the primary photovoltaic panel 2 and a connection between the secondary photovoltaic panel 3 and the plug connector 55 corresponding to the secondary photovoltaic panel 3 are located in the waterproof space. Specifically, a connection between the primary photovoltaic positive wire 23 and the primary-photovoltaic positive plug connector 5511, a connection between the primary photovoltaic negative wire 24 and the primary-photovoltaic negative plug connector 5521, a connection between the secondary photovoltaic positive wire 33 and the secondary-photovoltaic positive plug connector 5512, and a connection between the secondary photovoltaic negative wire 34 and the secondary-photovoltaic negative plug connector 5522 are located in the waterproof space. The junction box waterproof cover 54 may protect the waterproof space, thereby improving electrical safety.

In some embodiments of the present disclosure, the drive member 4 further includes a first limiting switch and a second limiting switch. The first limiting switch is configured to limit an ultimate extended position at which the multi-segmented telescopic rod 42 is extended away from the drive mechanism 41, and the second limiting switch is configured to limit an ultimate retracted position at which the multi-segmented telescopic rod 42 is retracted towards the drive mechanism 41. The ultimate positions of the multi-segmented telescopic rod 42 are limited by the first limiting switch and the second limiting switch, so that it is possible to prevent the drive motor 411 from being burnt due to overtravel. Therefore, each telescopic rod segment of the multi-segmented telescopic rod 42 has higher reliable extension and retraction actions, and thus is not prone to be damaged. Specifically, the first limiting switch and the second limiting switch limit an ultimate position of the final telescopic rod segment 422. When the final telescopic rod segment 422 is extended to the ultimate extended position away from the drive mechanism 41, the first limiting switch is triggered by the final telescopic rod segment 422 to generate a first signal to control the drive motor 411 to stop rotating. When the final telescopic rod segment 422 is retracted towards the drive mechanism 41 into the ultimate retracted position, the second limiting switch is triggered by the final telescopic rod segment 422 to generate a second signal to control the drive motor 411 to stop rotating.

In some embodiments of the present disclosure, the drive mechanism 41 includes a multi-segmented lead screw. Each telescopic rod segment of the multi-segmented telescopic rod is in a threaded connection with a corresponding lead screw segment. The multi-segmented lead screw includes a final lead screw segment 413. The final lead screw segment 413 has a rocker insertion opening 415 defined at a rod end of the final lead screw segment 413. The final telescopic rod segment 422 has a reserved emergency hole 423 defined at a rod end of the final telescopic rod segment 422. The reserved emergency hole 423 is used for a rocker to extend into the rocker insertion opening 415 of the final lead screw segment, and the rocker is rotated to drive the multi-segmented lead screw to rotate, to drive the multi-segmented telescopic rod 42 to be extended away from or retracted towards the drive mechanism 41. The traditional electrical push rod cannot be extended after it loses power or is damaged, but the drive member 4 used in the present disclosure may be configured to extend the telescopic rod 42 by the rocker in an emergency. In other words, a manual rocker function is to facilitate user's use for the telescopic rod 42 when the telescopic rod 42 fails or has no power supply during use, and to prevent the secondary photovoltaic panel 3 from being irrecoverable and affecting driving safety.

Specifically, in some embodiments, the driving mechanism 41 includes a drive motor 411 and a two-segmented lead screw. The two-segmented lead screw includes a first lead screw segment 412 and a final lead screw segment 413. The drive motor 411 is configured to drive the first lead screw segment 412 to rotate. Each telescopic rod segment of the telescopic rod 42 is provided with a nut in a threaded connection with a corresponding lead screw segment. When the first lead screw segment 412 is driven by the drive motor 411 to rotate forwardly, the forward rotation of the first lead screw segment 412 may be transmitted to the final lead screw segment 413, and the nut of each telescopic rod segment 42 drives the corresponding telescopic rod segment 42 to be extended. When the first lead screw segment 412 is driven by the drive motor 411 to rotate reversely, the reverse rotation of the first lead screw segment 412 may be transmitted to the final lead screw segment 413, and the nut of each telescopic rod segment 42 drives the corresponding telescopic rod segment 42 to be retracted. Of course, the drive motor 411 may further drive each telescopic rod segment 42 to be extended or retracted through other transmission mechanisms such as a gear and rack transmission mechanism. A gear is disposed on an output shaft of the drive motor 411. A rack is disposed on each telescopic rod segment 42 and engaged with the gear. When the gear is driven by the drive motor 411 to rotate forwardly, the rack is driven by the gear to drive the corresponding telescopic rod segment 42 to be extended. When the gear is driven by the drive motor 411 to rotate reversely, the rack is driven by the gear to drive the corresponding telescopic rod segment 42 to be retracted.

In the embodiments shown in FIG. 14 to FIG. 17, the drive member 4 includes a drive mechanism 41 and a two-segmented telescopic rod 42. The two-segmented telescopic rod 42 includes a first telescopic rod segment 421 and a final telescopic rod segment 422. An end of the first telescopic rod segment 421 is located in the drive mechanism 41. The first telescopic rod segment 421 and the final telescopic rod segment 422 are nested to each other. An outer end of the final telescopic rod segment 422 is fixedly mounted on the secondary photovoltaic panel 3. The drive mechanism 41 includes a drive motor 411 and a two-segmented lead screw. The two-segmented lead screw includes a first lead screw segment 412 and a final lead screw segment 413. The first telescopic rod segment 421 is provided with a first nut segment 4211 in a threaded connection with the first lead screw segment 412, and the final telescopic rod segment 422 is provided with a final nut segment 4221 in a threaded connection with the final lead screw segment 413. When the first lead screw segment 412 is driven by the drive motor 411 to rotate forwardly, the first telescopic rod segment 421 is driven by the first nut segment 4211 to extend, and the final telescopic rod segment 422 is driven by the final nut segment 4221 to extend. When the first lead screw segment 412 is driven by the drive motor 411 to rotate reversely, the first telescopic rod segment 421 is driven by the first nut segment 4211 to retract, and the final telescopic rod segment 422 is driven by the final nut segment 4221 to retract. The extension and retraction actions of the first telescopic rod segment 421 and the final telescopic rod segment 422 may be synchronized or non-synchronized. Extension and retraction action principles of the drive member including the multi-segmented telescopic rod are a common mechanical principle in the art and omitted herein.

In some embodiments of the present disclosure, the solar photovoltaic panel assembly 10 further includes an emergency limiting lock 57. The emergency limiting lock 57 is mounted at an end of the primary photovoltaic panel 2 away from the drive mechanism 41. As shown in FIG. 3 and FIG. 4, the emergency limiting lock 57 is mounted at an F2 end of the primary photovoltaic panel 2, and is at least configured to limit a position where the secondary photovoltaic panel 3 slides outwardly. In special cases, in a case where the telescopic rod 42 cannot be extended due to no power supply or damage to the drive motor 411, the rocker may be inserted into an interior of the drive member 4 through the reserved emergency hole 423 to shake an internal mechanism to drive the telescopic rod 42 to extend and retract, and the emergency limiting lock 57 is used for fixing the telescopic rod 42 to prevent the secondary photovoltaic panel 3 from sliding outwardly.

Referring to FIG. 4, the emergency limiting lock 57 includes a limiting lock housing 571 having a limiting lock hole 572, and the fastener passes through the limiting lock hole 572 to be fastened to the primary photovoltaic frame 21, thereby realizing mounting and fixation of the emergency limiting lock 57 on the primary photovoltaic panel 2. The emergency limiting lock 57 also has a lock tongue 574. The lock tongue 574 is mounted on the limiting lock housing 571 and is able to be pushed to a blocking position at which the secondary photovoltaic panel 3 is blocked from sliding. The emergency limiting lock 57 also has a reset key 573. The reset key 573 is mounted at the limiting lock housing 571. When the reset key 573 is pressed, the lock tongue 574 is reset to an unblocking position. At this time, the secondary photovoltaic panel 3 can slide relative to the primary photovoltaic panel 2. Pressing the lock tongue 574 of the emergency limiting lock 57 may prevent the secondary photovoltaic panel 3 from being thrown out during driving, causing danger.

Figure 10:
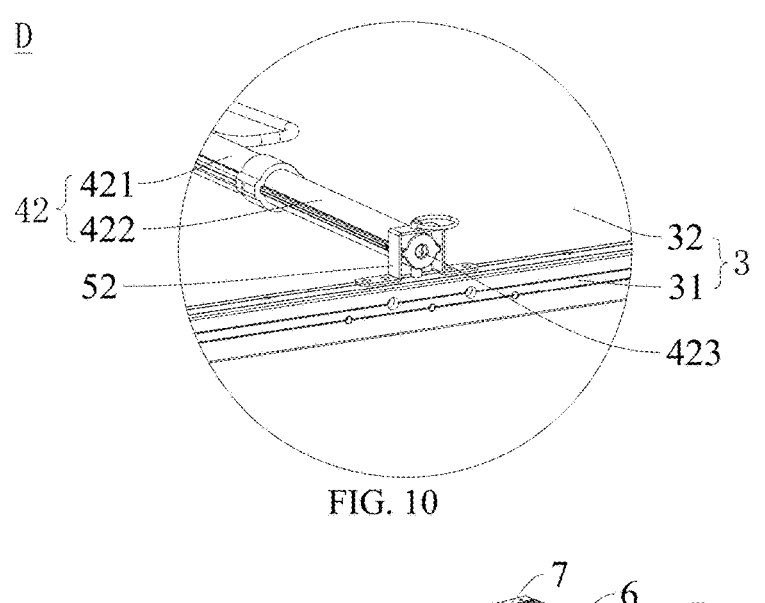
FIG. 10 is a schematic partially enlarged view at D in FIG. 7.

In some embodiments of the present disclosure, the solar photovoltaic panel assembly 10 further includes a waterproof plug 58. The waterproof plug 58 is mounted to the final telescopic rod segment 422, and blocks the reserved emergency hole 423. When it is not necessary to manually drive the telescopic rod 42 to extend or retract, the waterproof plug 58 blocks the reserved emergency hole 423, so that external water vapor and impurities can be prevented from entering the interior of the drive member 4 through the reserved emergency hole 423. When it is necessary to manually drive the telescopic rod 42 to extend or retract, the waterproof plug 58 is removed from the reserved emergency hole 423, and the rocker may be extended into the rocker insertion opening 415 of the final lead screw segment 413 through the reserved emergency hole 423. At this time, rotating the rocker may drive the final lead screw segment 413 to rotate, and rotating the first lead screw segment 412 may drive the final lead screw segment 413 to rotate, and further drive the multi-segmented telescopic rod 42 to extend or retract relative to the drive mechanism 41. That is, as long as the waterproof plug 58 at the rod end of the final telescopic rod segment 422 is removed (as shown in FIG. 13) in an emergency, and then the rocker is inserted into the reserved emergency hole 423 (as shown in FIG. 10), the rocker is connected to the rocker insertion opening 415 and then shakes to extend and retract the telescopic rod 42, so that the secondary photovoltaic panel 3 is driven by the final telescopic rod segment 422 to slide. There may be an interference fit between the waterproof plug 58 and the reserved emergency hole 423.

In some embodiments of the present disclosure, the solar photovoltaic panel assembly 10 further includes a controller. The controller is configured to drive the telescopic rod 42 to extend or retract. Optionally, the controller is a controller equipped with a remote controller or a controller controlled by an application, and the controller is configured to receive a control instruction to control the drive member 4 to operate. In this way, the telescopic rod 42 can be remotely controlled to be extended or retracted. For example, the user may issue a control instruction to the controller in a passenger compartment, so that the telescopic rod 42 is controlled to be extended or retracted, without having to walking to a position where the solar photovoltaic panel assembly 10 is mounted, which is conducive to an improvement in the user experience. The controller may be mounted on a roof of the recreational vehicle.

In some embodiments of the present disclosure, the controller may realize control and protection of the telescopic rod 42 and record a state of the telescopic rod 42, and a power supply of the controller may be obtained through the photovoltaic panel or the controller may be powered by a lithium battery inside the recreational vehicle or the electric device.

In some embodiments of the present disclosure, one controller may simultaneously control four drive members 4, and the controller has an obstruction detect function. When the secondary photovoltaic panel 3 is blocked during a sliding-out process, the controller may control the drive motor 411 to stop, to prevent the telescopic rod 42 from being damaged. Although one controller may be connected to four drive members 4 simultaneously, the obstruction detect function is separate, without a case where the four drive members 4 are stopped simultaneously because one drive member 4 meets obstruction. The controller has a self-contained remote controller, which may control retraction, stop, and the like of the telescopic rod segments 42 through remote control, and the controller may also realize control through a mobile phone host computer and the like.

In some embodiments of the present disclosure, referring to FIG. 1 to FIG. 3, FIG. 5, FIG. 7, FIG. 11, and FIG. 20 to FIG. 23, the solar photovoltaic panel assembly 10 further includes a fixed wing 6. The fixed wing 6 is fixedly mounted on each of the first frame 11 and the second frame 12 and has an adhesive accommodation groove 61 defined at a side surface of the fixed wing 6. After adhesive is coated to an interior of the adhesive accommodation groove 61, the fixed wing 6 may be fixed to the vehicle 100 or other electric devices. The fixed wing 6 includes a plurality of adhesive accommodation arms 65, and the adhesive accommodation groove 61 is defined by gaps between the plurality of adhesive accommodation arms 65. A surface of the adhesive accommodation arm 65 may be configured as a wavy surface. When adhesive is applied, the wavy surface may allow more adhesion positions for the adhesive to strengthen viscosity, so that the fixed wing 6 can be more firmly adhered to a surface of the roof of vehicle or surfaces of other bases.

In some embodiments of the present disclosure, referring to FIG. 1 to FIG. 3, FIG. 5, FIG. 7, FIG. 11, and FIG. 20 to FIG. 22, the fixed wing 6 has a reserved screw site 62 located at an end of the fixed wing 6, and the solar photovoltaic panel assembly 10 further includes a wing fixing support 7. The wing fixing support 7 includes a first support plate 71 and a second support plate 72 connected to the first support plate 71. The first support plate 71 is fixed at the reserved screw site 62, and the second support plate 72 has a fixing hole 721 defined thereon. Referring to FIG. 20 to FIG. 23, the first support plate 71 has a support plate hole 711, and a support bolt passes through the support plate hole 711 to be fastened to the reserved screw site 62, thereby realizing connection and fixation of the wing fixing support 7 and the fixed wing 6. The fixing bolt may be fastened to the base after passing through the fixing holes 721. Therefore, the mounting and fixation of the solar photovoltaic panel assembly 10 on the base can be realized. Optionally, the base may be a roof, a top of the vehicle body 20 of the vehicle 100, the ground, or the like.

Optionally, a plurality of reserved screw sites 62 are provided. Therefore, it is beneficial to an improvement in connection firmness between the wing fixing support 7 and the fixed wing 6.

Alternatively, there are a plurality of reserved screw sites 62 in an embodiment. A number of the support plate holes 711 is equal to a number of the reserved screw sites 62, and positions of the support plate holes 711 corresponds to positions of the reserved screw sites 62 in one-to-one correspondence. The bolt passes through the support plate hole 711 to be fastened to the corresponding reserved screw site 62. Therefore, there are a plurality of connection fixing points between the wing fixing support 7 and the fixed wing 6, which is conducive to an improvement in connection firmness of the wing fixing support 7 and the fixed wing 6. In the embodiments of FIG. 20 to FIG. 23, each of the wing fixing supports 7 has two support plate holes 711, and the wing fixing support 7 is engaged with the support bolt through the two support plate holes 711 to realize connection and fixation of the wing fixing support 7 and the reserved screw site 62.

Figure 21:
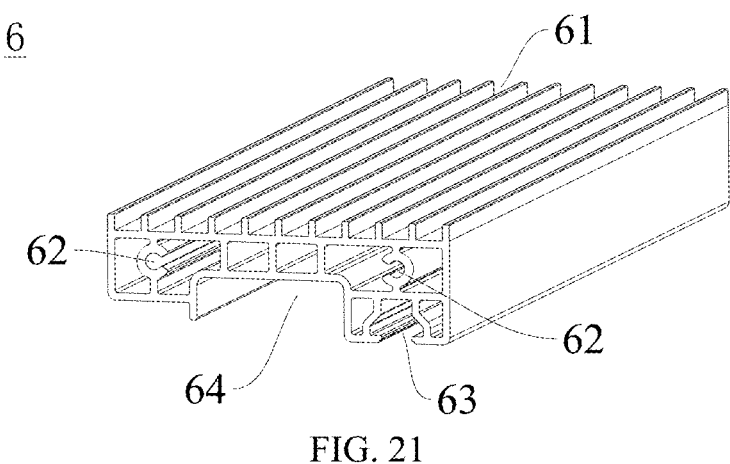
FIG. 21 is a schematic perspective view of a fixed wing in another viewing angle.
Figure 22:
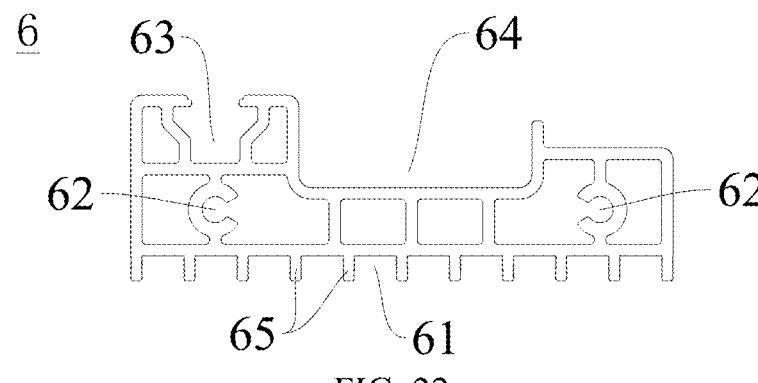
FIG. 22 is a main view of a fixed wing.
Figure 23:
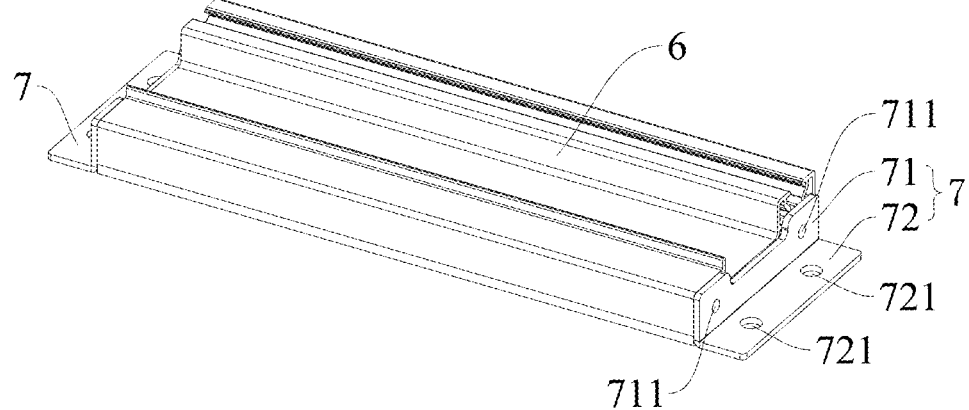
FIG. 23 is a schematic perspective view of a fixed wing and a wing fixing support.

In some embodiments of the present disclosure, referring to FIG. 20 to FIG. 22, the fixed wing 6 has a fastener groove site 63 located at a side of the fixed wing 6 facing away from the adhesive accommodation groove 61, and the solar photovoltaic panel assembly 10 further includes a wing fastening bolt. The wing fastening bolt penetrates the first frame 11 or the second frame 12 to be fastened to a nut in the fastener groove site 63. Therefore, mounting and fixation of the fixed wing 6 on the first frame 11 or the second frame 12 are realized. As shown in FIG. 1 to FIG. 3, FIG. 5, FIG. 7, and FIG. 11, after the fixed wing 6 is fixed in place on the base, a nut is placed in the fastener groove site 63. Then, only the first frame 11 and the second frame 12 need to be respectively placed on the main body groove sites 64 of the respective fixed wings 6, and then are fastened through the wing fastening bolt and the nut in the fastener groove site 63.

In some embodiments of the present disclosure, referring to FIG. 20 to FIG. 22, an interior of the fixed wing 6 is of a hollowed-out structure. Therefore, the weight of the fixed wing 6 can be reduced, and the cost can be lowered. The fixed wing 6 is a fixing frame for fixing the entire solar photovoltaic panel assembly 10. The fixed wing 6 may be fixed on the roof with structural adhesive or screws first, and then the entire support frame 1 is placed to facilitate replacement, mounting, and disassembly.

In some embodiments of the present disclosure, referring to FIG. 1, FIG. 3, FIG. 5, FIG. 7, FIG. 24, and FIG. 25, each of the first frame 11 and the second frame 12 includes a frame body 13, a photovoltaic panel support arm 14 and a wing mounting arm 15. The photovoltaic panel support arm 14 is connected to the frame body 13. The primary photovoltaic panel 2 is mounted on the corresponding photovoltaic panel support arm 14. The wing mounting arm 15 is connected to the frame body 13. The wing mounting arm 15 is located at a side of the frame body 13 facing away from the primary photovoltaic panel 2. The fixed wing 6 has a main body groove site 64. The frame body 13 is embedded in the main body groove site 64. The wing mounting arm 15 has a mounting hole 151 defined thereon, and the wing fastening bolt being engaged with the mounting hole 151. The wing fastening bolt passes through the mounting hole 151 to be fastened with the nut in the fastener groove site 63 to complete connection and fixation of the fixed wing 6 and the corresponding frame.

According to some embodiments of the present disclosure, referring to FIG. 3, FIG. 5, FIG. 7, and FIG. 25 to FIG. 27, a sliding rail 8 is disposed at each of the first frame 11 and the second frame 12. The secondary photovoltaic panel 3 is adapted to be in a sliding fit with sliding rails 8 at two sides. The sliding rails 8 at the two sides are configured to guide a sliding movement of the secondary photovoltaic panel 3, so that the secondary photovoltaic panel 3 has a more stable and smoother sliding movement.

In some embodiments of the present disclosure, referring to FIG. 3, FIG. 5, FIG. 7, and FIG. 25 to FIG. 27, the sliding rail 8 is a multi-sectioned sliding rail. The multi-sectioned sliding rail at least includes a first sliding rail section 81 and a final sliding rail section 83. The first sliding rail section 81 is mounted at the corresponding first frame 11 or the corresponding second frame 12. The secondary photovoltaic panel 3 is mounted at the final sliding rail section 83 through an angle support 92, and two adjacent sliding rail sections of the sliding rail 8 can be slidable relative to each other in the sliding-out direction of the secondary photovoltaic panel 3. The secondary photovoltaic panel 3 is a hidden photovoltaic panel. The angle support 92 is mounted at two sides of the secondary photovoltaic panel 3, and then is fixed on the final sliding rail section 83. Therefore, the secondary photovoltaic panel 3 can slide freely through the sliding rail 8.

In the embodiments shown in FIG. 3, FIG. 5, FIG. 7, FIG. 25 to FIG. 27, the sliding rail 8 is a three-sectioned load-bearing sliding rail structure, and the three-sectioned sliding rail 8 at least includes a first sliding rail section 81, a middle sliding rail section 82, and a final sliding rail section 83. The first sliding rail section 81 is mounted at the support frame 1. For example, the first sliding rail section 81 may be fixed on the first frame 11 or the second frame 12 through fasteners such as screws. The middle sliding rail section 82 may be slidably mounted at the first sliding rail section 81. In other words, the middle sliding rail section 82 is disposed on a corresponding first sliding rail section 81, and can slide in a length direction of the first sliding rail section 81, i.e., the middle sliding rail section 82 and the first sliding rail section 81 can slide relative to each other in the sliding-out direction of the secondary photovoltaic panel 3. The final sliding rail section 83 may be slidably mounted at the middle sliding rail section 82. In other words, the final sliding rail section 83 is disposed at the corresponding middle sliding rail section 82, and can slide in a length direction of the middle sliding rail section 82, i.e., the final sliding rail section 83 and the middle sliding rail section 82 can slide relative to each other in the sliding-out direction of the secondary photovoltaic panel 3. The secondary photovoltaic panel 3 is also fixed onto the final sliding rail section 83 through the angle support 92. For example, the secondary photovoltaic panel 3 may be fixed onto the angle support 92 through fasteners such as screws, and the angle support 92 may be fixed onto the final sliding rail section 83 through fasteners such as screws. In this way, when the final sliding rail section 83 slides, the secondary photovoltaic panel 3 can be driven to slide synchronously.

In some embodiments of the present disclosure, each of the first frame 11 and the second frame 12 includes a frame body 13 and a photovoltaic panel support arm 14. The frame body 13 has a sliding rail fixing groove 16 configured for mounting of the sliding rail 8. The photovoltaic panel support arm 14 is connected to the frame body 13, and the primary photovoltaic panel 2 is mounted to the corresponding photovoltaic panel support arm 14. The sliding rail 8 is mounted at the sliding rail fixing groove 16. The frame body 13 has a reserved hole defined thereon. When the sliding rail 8 is mounted, the sliding rail 8 is conveniently positioned and fastened to the reserved hole of the corresponding frame body 13. Moreover, the damage to the sliding rail 8 can be effectively prevented because of being exposed to rain, dust, etc. for a long time, and corrosion on the sliding rail 8 can be reduced. An overall new design of the first frame 11 and the second frame 12 has features such as ease of mounting and disassembly, and a reduction in transportation costs.

Referring to FIG. 24, by taking the second frame 12 as an example, the photovoltaic panel support arm 14 of the second frame 12 includes a transverse support arm 141 and a vertical support arm 142. The transverse support arm 141 is configured for supporting and fixing a bottom surface of the primary photovoltaic frame 21, and the vertical support arm 142 is configured for supporting and fixing a vertical surface of the primary photovoltaic frame 21. Each of the transverse support arm 141 and the vertical support arm 142 has a reserved hole for connecting and fixing of the primary photovoltaic frame 21. The first frame 11 and the second frame 12 are arranged symmetrically at the two sides of the primary photovoltaic panel 2.

In some embodiments of the present disclosure, referring to FIG. 1, FIG. 2, and FIG. 5, a first shield 91 may be provided at an end (i.e., an F1 end) of the first frame 11 and/or the second frame 12 away from the sliding-out direction, to protect an interior of the first frame 11 and an interior of the second frame 12 and prevent dusts and sundries from entering the interior of the first frame 11 and the interior of the second frame 12. Moreover, the secondary photovoltaic panel 3 slides out or in at F2 ends of the first frame 11 and the second frame 12. The first shield 91 does not block a sliding-out movement and a sliding-in movement of the secondary photovoltaic panel 3. In the example of FIG. 1, the first shield 91 is disposed at each of the F1 end of the first frame 11 and the F1 end of the second frame 12. In the example of FIG. 2 and FIG. 5, only the F1 end of the second frame 12 is provided with the first shield 91. In some embodiments not shown in the drawings, the first shield 91 may also be provided only at the F1 end of the first frame 11.

In some embodiments of the present disclosure, referring to FIG. 3, FIG. 7, FIG. 11, FIG. 24, and FIG. 25, a second shield 93 may be provided at an end (i.e., an F2 end) of the first frame 11 and/or the second frame 12 close to the sliding-out direction. The second shield 93 is only configured for the sliding rail 8 to enter into and exit from the sliding rail fixing groove 16, which is conducive to a reduction in other foreign objects entering the sliding rail 8.

According to a specific example of the present disclosure, when the solar photovoltaic panel assembly 10 is mounted at the roof of the recreational vehicle, the fixed wing 6 may be bonded to the roof of the recreational vehicle with a silicone structural adhesive, or after the fixed wing 6 is bonded, the fixed wing 6 may be further fixed on the roof of the vehicle by using the bolt to pass through the fixing hole 721 of the wing fixing support 7. After practical testing, in this manner, a bonding force may withstand an external force of at least 3000 N, so that the fixed wing 6 will not be loosened by an inertia force caused by bumps or sudden braking when the vehicle 100 is driving.

With the solar photovoltaic panel assembly 10 according to the embodiments of the present disclosure, the primary photovoltaic panel 2 is fixed on the first frame 11 and the second frame 12 as a frame of the whole product, and this frame plays a role of fixing and supporting used components. A height of this frame is 68 mm. The sliding rail 8 may be mounted on the frame, and the photovoltaic frame is specially optimized. In this way, a thickness of a single photovoltaic panel is 23 mm. The fixed wing 6 is designed for fixing the support frame 1 and the base, to allow an overall height of the solar photovoltaic panel assembly 10 to be controlled within 85 mm, which can save a height space.

The solar photovoltaic panel assembly 10 according to the embodiments of the present disclosure is generally convenient for transportation, simple for mounting, lightweight, which lowers an overall cost and reduces a transportation cost. A self-developed multi-segmented telescopic rod 42 has high reliability, good stability, and low noise, and the reserved emergency hole 423 reserved by the self-developed multi-segmented telescopic rod 42 may also cope with emergency situations. The support frame 1, the primary photovoltaic panel 2, and the secondary photovoltaic panel 3 have all been optimized, and targeted designs have been carried out to reduce overall heights of the support frame 1, the primary photovoltaic panel 2, and the secondary photovoltaic panel 3. The overall structure is stable and reliable and has strong maintainability.

Figures 27, 28:
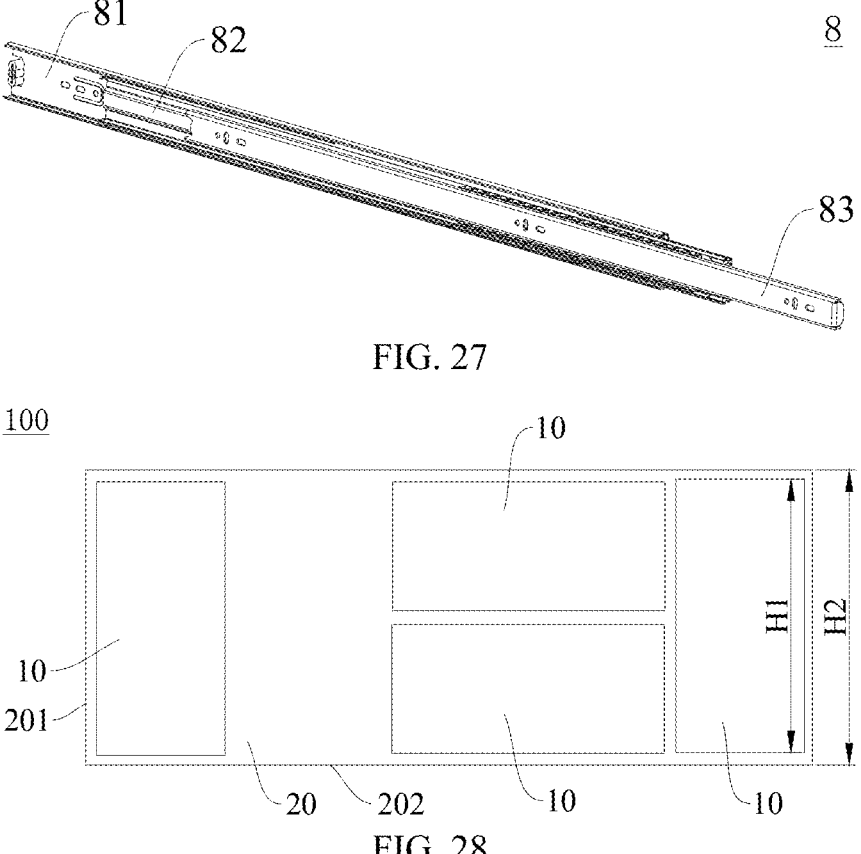
FIG. 27 is a schematic view of a sliding rail at a deployment position.
FIG. 28 is a schematic view of a roof of a vehicle body of a vehicle and a solar photovoltaic panel assembly according to an embodiment of the present disclosure.

As illustrated in FIG. 28, according to embodiments of another aspect of the present disclosure, a vehicle 100 is provided. The vehicle 100 includes a vehicle body 20 and the solar photovoltaic panel assembly 10 as described in the above embodiments. The solar photovoltaic panel assembly 10 is mounted on the roof of the vehicle body 20. In this way, the solar photovoltaic panel assembly 10 can conveniently receive the irradiation of sunlight to satisfy demands for the power generation.

In some embodiments of the present disclosure, the vehicle 100 further includes an energy storage battery. The controller is adapted to be connected to the plug connector 55 at the junction box 53. In this way, the energy storage battery is connected to the controller. The controller is configured to convert solar energy from the primary photovoltaic panel 2 and/or the secondary photovoltaic panel 3 into electrical energy and store the electrical energy in the energy storage battery. The electrical energy in the energy storage battery may be used by an electric equipment. The energy storage battery may directly provide a direct current for the electric equipment, and may also provide an alternating current for the electric equipment through an inverter. Optionally, the energy storage battery may be a lithium battery having a low cost. The controller and the energy storage battery may be placed inside the vehicle 100, and a wire of the solar photovoltaic panel assembly 10 extends into an interior of the vehicle 100 to supply power for the energy storage battery by the controller. Of course, the controller and the energy storage battery may also be placed outside the vehicle 100.

The vehicle 100 may be a recreational vehicle, and electricity generated by the solar photovoltaic panel assembly 10 may be used by the electric equipment in the recreational vehicle such as an electronic device, a television, a refrigerator, an air conditioner, and a water pumping device.

In some embodiments of the present disclosure, as illustrated in FIG. 28, the roof of the vehicle body 20 includes a top transverse edge 201 extending in a left-right direction of the vehicle 100 and a top longitudinal edge 202 extending in a front-rear direction of the vehicle 100. A length of the solar photovoltaic panel assembly 10 is H1, a length of the top transverse edge 201 is H2, and H1<H2. The solar photovoltaic panel assembly 10 is in an elongated shape, which can maximize the use of a space at the roof of the vehicle body 20.

With the vehicle 100 according to the embodiments of the present disclosure, the solar photovoltaic panel assembly 10 uses the primary photovoltaic panel 2 to connect the first frame 11 and the second frame 12, without the need for providing the frame for connecting the first frame 11 and the second frame 12. Therefore, it is conducive to the reduction of the total weight of the support frame 1 and realizing the lightweight design of the overall structure of the solar photovoltaic panel assembly 10. The secondary photovoltaic panel 3 slides outwardly to the deployment position relative to the primary photovoltaic panel 2 by providing the solar photovoltaic panel assembly 10 as required, to increase the power generation area of the solar photovoltaic panel assembly 10, thereby increasing the power generation amount to satisfy the user's requirements for power utilization.

The electric device according to embodiments of yet another aspect of the present disclosure includes the solar photovoltaic panel assembly 10 as described above.

With the electric device according to the embodiments of the present disclosure, the solar photovoltaic panel assembly 10 of the electric device uses the primary photovoltaic panel 2 to connect the first frame 11 and the second frame 12, and there is no need to provide the frame for connecting the first frame 11 and the second frame 12. Therefore, it is beneficial to the reduction of the total weight of the support frame 1, and realize the lightweight design of the overall structure of the solar photovoltaic panel assembly 10. The secondary photovoltaic panel 3 slides outwardly to the deployment position relative to the primary photovoltaic panel 2 by providing the solar photovoltaic panel assembly 10 as required, to increase the power generation area of the solar photovoltaic panel assembly 10, thereby increasing the power generation amount to satisfy the user's requirements for power utilization.

Optionally, the electric device may be a ship, an aircraft, a machine tool, a household appliance, or the like.

In the description of the present disclosure, it needs to be understood that, terms such as "longitudinal", "lateral", "length", "width", "thickness", "over", "below", "front", "back", "left", "right", "vertical", "horizontal", "top", "bottom", "in", "out", etc., are based on the orientation or position relationship shown in the drawings, and are only for the convenience of describing the present disclosure and simplifying the description, rather than indicating or implying that the associated device or element must have a specific orientation, or be constructed and operated in a specific orientation, and therefore cannot be understood as a limitation to the present disclosure.

In the present disclosure, unless specified or limited otherwise, the terms "mounted," "connected," "coupled" and "fixed" are understood broadly, such as a fixed connection or a detachable connection or connection as one piece; mechanical connection or electrical connection or mutual communication; direct connection or indirect connection through an intermediate; internal communication of two components or the interaction relationship between two components. For those skilled in the art, the specific meaning of the above-mentioned terms in the embodiments of the present disclosure can be understood according to specific circumstances.

In the description of this specification, descriptions with reference to the terms "an embodiment", "some embodiments", "examples", "specific examples", or "some examples", etc. mean that specific features, structure, materials, or characteristics described in conjunction with the embodiment or example are included in at least one embodiment or example of the present disclosure. In this specification, the schematic representations of the above terms do not necessarily refer to the same embodiment or example. Moreover, the described specific features, structures, materials or characteristics may be combined in any one or more embodiments or examples in a suitable manner. In addition, those skilled in the art can combine the different embodiments or examples described in this specification.

Although embodiments according to the present disclosure have been shown and described, it would be appreciated that the above embodiments are illustrative and cannot be construed to limitation on the present disclosure, and changes, alternatives, modifications, and variations can be made to the embodiments by those skilled in the art without departing from scope of the present disclosure.

What is claimed is:

1. A solar photovoltaic panel assembly, comprising:
a support frame that is a split-type frame and comprising a first frame and a second frame arranged opposite to the first frame;
a primary photovoltaic panel located between the first frame and the second frame, the first frame being connected to the second frame by the primary photovoltaic panel;
a secondary photovoltaic panel located between the first frame and the second frame, the secondary photovoltaic panel being slidable along the first frame and/or the second frame into a storage position at which the secondary photovoltaic panel has a maximum overlapping area with the primary photovoltaic panel in a thickness direction and a deployment position at which the secondary photovoltaic panel slides outwardly relative to the primary photovoltaic panel; and
a drive member fixedly mounted at the primary photovoltaic panel and configured to drive the secondary photovoltaic panel to slide;
wherein the drive member is in a form of an electrical telescopic rod and comprises:
a drive mechanism fixedly mounted at the primary photovoltaic panel; and
a multi-segmented telescopic rod at least comprising a first telescopic rod segment and a final telescopic rod segment, an end of the first telescopic rod segment being located in the drive mechanism, two adjacent telescopic rod segments of the multi-segmented telescopic rod being nested to each other, the final telescopic rod segment being fixedly connected to the secondary photovoltaic panel, wherein the drive mechanism is capable of driving the multi-segmented telescopic rod to be extended away from or retracted towards the drive mechanism;
wherein the drive mechanism comprises a multi-segmented lead screw, each telescopic rod segment of the multi-segmented telescopic rod being in a threaded connection with a corresponding lead screw segment, the multi-segmented lead screw comprising a final lead screw segment having a rocker insertion opening defined at a rod end of the final lead screw segment; and the final telescopic rod segment has a reserved emergency hole defined at a rod end of the final telescopic rod segment, the reserved emergency hole being used for a rocker to extend into the rocker insertion opening of the final lead screw segment, and the rocker being rotated to drive the multi-segmented lead screw to rotate, to drive the multi-segmented telescopic rod to be extended away from or retracted towards the drive mechanism; and
wherein the solar photovoltaic panel assembly further comprises a waterproof plug mounted at the final telescopic rod segment and blocking the reserved emergency hole.

2. The solar photovoltaic panel assembly according to claim 1, wherein the secondary photovoltaic panel is located at a side of the primary photovoltaic panel facing towards a mounting base.

3. The solar photovoltaic panel assembly according to claim 1, wherein:
the drive member is located at a side of the secondary photovoltaic panel facing away from the primary photovoltaic panel; and
the solar photovoltaic panel assembly further comprises a first fixing support and a second fixing support, wherein:
the drive mechanism is fixedly mounted at the primary photovoltaic panel through the first fixing support; and
the final telescopic rod segment is fixedly mounted at the secondary photovoltaic panel through the second fixing support.

4. The solar photovoltaic panel assembly according to claim 3, wherein each of the primary photovoltaic panel and the secondary photovoltaic panel comprises a photovoltaic frame and a photovoltaic lamination structure fixedly mounted at the respective photovoltaic frame, the drive mechanism being fixedly mounted at the photovoltaic frame of the primary photovoltaic panel through the first fixing support, and the final telescopic rod segment being fixedly mounted at the photovoltaic frame of the secondary photovoltaic panel through the second fixing support.

5. The solar photovoltaic panel assembly according to claim 4, wherein:
the photovoltaic frame has a profile with a thickness ranging from 1.5 mm to 4 mm, the photovoltaic frame having a threaded hole defined thereon; and
the solar photovoltaic panel assembly further comprises a photovoltaic fastening bolt penetrating the first frame or the second frame to be fastened into the threaded hole.

6. The solar photovoltaic panel assembly according to claim 3, further comprising a junction box fixed to the first fixing support, the junction box having a plug connector provided thereon,
wherein the primary photovoltaic panel and the secondary photovoltaic panel are adapted to be connected to corresponding plug connectors.

7. The solar photovoltaic panel assembly according to claim 6, further comprising a junction box waterproof cover adapted to be mounted and fixed to the junction box, a waterproof space being formed between the junction box waterproof cover and the junction box, and a connection between the primary photovoltaic panel and the plug connector corresponding to the primary photovoltaic panel and a connection between the secondary photovoltaic panel and the plug connector corresponding to the secondary photovoltaic panel being located in the waterproof space.

8. The solar photovoltaic panel assembly according to claim 1, wherein the drive member further comprises:

a first limiting switch configured to limit an ultimate extended position at which the multi-segmented telescopic rod is extended away from the drive mechanism; and a second limiting switch configured to limit an ultimate retracted position at which the multi-segmented telescopic rod is retracted towards the drive mechanism.

9. The solar photovoltaic panel assembly according to claim 1, further comprising an emergency limiting lock mounted at an end of the primary photovoltaic panel away from the drive mechanism, the emergency limiting lock comprising a limiting lock housing and a lock tongue, the lock tongue being mounted at the limiting lock housing and being able to be pushed to a blocking position at which the secondary photovoltaic panel is blocked from sliding.

10. The solar photovoltaic panel assembly according to claim 1, further comprising a controller, the controller being a controller equipped with a remote controller or a controller controlled by an application, and the controller being configured to receive a control instruction to control the drive member to operate.

11. The solar photovoltaic panel assembly according to claim 1, further comprising a fixed wing fixedly mounted at each of the first frame and the second frame, the fixed wing having an adhesive accommodation groove defined at a side surface of the fixed wing.

12. The solar photovoltaic panel assembly according to claim 11, wherein the fixed wing has a reserved screw site located at an end of the fixed wing; and the solar photovoltaic panel assembly further comprises a wing fixing support comprising a first support plate and a second support plate connected to the first support plate, the first support plate being fixed at the reserved screw site, and the second support plate having a fixing hole defined thereon; or wherein the fixed wing has a fastener groove site located at a side of the fixed wing facing away from the adhesive accommodation groove; and the solar photovoltaic panel assembly further comprises a wing fastening bolt penetrating the first frame or the second frame to be fastened to a nut in the fastener groove site.

13. The solar photovoltaic panel assembly according to claim 12, wherein each of the first frame and the second frame comprises:

28 a frame body;

a photovoltaic panel support arm connected to the frame body, the primary photovoltaic panel being mounted at a corresponding photovoltaic panel support arm; and a wing mounting arm connected to the frame body and located at a side of the frame body facing away from the primary photovoltaic panel, the fixed wing having a main body groove site, the frame body being embedded in the main body groove site, the wing mounting arm having a mounting hole defined thereon, the wing fastening bolt being engaged with the mounting hole.

14. The solar photovoltaic panel assembly according to claim 1, wherein a sliding rail is disposed at each of the first frame and the second frame, the secondary photovoltaic panel being adapted to be in a sliding fit with sliding rails at two sides.

15. The solar photovoltaic panel assembly according to claim 14, wherein the sliding rail is a multi-sectioned sliding rail, the multi-sectioned sliding rail at least comprising a first sliding rail section and a final sliding rail section, the first sliding rail section being mounted at a corresponding first frame or a corresponding second frame, the secondary photovoltaic panel being mounted at the final sliding rail section through an angle support, and two adjacent sliding rail sections of the sliding rail being slidable relative to each other in a sliding-out direction of the secondary photovoltaic panel; or wherein each of the first frame and the second frame comprises:

a frame body having a sliding rail fixing groove configured for mounting of the sliding rail; and a photovoltaic panel support arm connected to the frame body, the primary photovoltaic panel being mounted at a corresponding photovoltaic panel support arm.

16. A vehicle, comprising:

a vehicle body; and the solar photovoltaic panel assembly according to claim 1, the solar photovoltaic panel assembly being mounted at a roof of the vehicle body.

17. An electric device, comprising the solar photovoltaic panel assembly according to claim 1.

* * * * *